US009568058B2

(12) United States Patent (10) Patent No.: US 9,568,058 B2
Sakashita et al. (45) Date of Patent: Feb. 14, 2017

(54) DISC BRAKE

(71) Applicant: HITACHI AUTOMOTIVE SYSTEMS, LTD., Ibaraki (JP)

(72) Inventors: Takayasu Sakashita, Tokyo (JP); Yuki Naito, Zama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/804,422

(22) Filed: Jul. 21, 2015

(65) Prior Publication Data

US 2016/0032994 A1 Feb. 4, 2016

(30) Foreign Application Priority Data

Jul. 31, 2014 (JP) .................................. 2014-157186
Dec. 26, 2014 (JP) .................................. 2014-265019

(51) Int. Cl.
| | | |
|---|---|---|
| *F16D 65/18* | (2006.01) | |
| *F16D 55/225* | (2006.01) | |
| *F16D 55/226* | (2006.01) | |
| *F16D 121/24* | (2012.01) | |
| *F16D 121/26* | (2012.01) | |
| *F16D 125/36* | (2012.01) | |
| *F16D 125/40* | (2012.01) | |

(Continued)

(52) U.S. Cl.
CPC .............. *F16D 65/18* (2013.01); *F16D 55/225* (2013.01); *F16D 55/226* (2013.01); *F16D 2121/24* (2013.01); *F16D 2121/26* (2013.01); *F16D 2125/36* (2013.01); *F16D 2125/40* (2013.01); *F16D 2125/48* (2013.01); *F16D 2125/50* (2013.01)

(58) Field of Classification Search
CPC ...... F16D 55/225; F16D 65/18; F16D 55/226; F16D 2121/24; F16D 2121/26; F16D 2125/50; F16D 2125/40; F16D 2121/48; F16D 2125/36; F16D 65/153; F16D 2125/38
USPC ............ 188/72.3, 72.8, 71.9, 72.1, 156, 162
See application file for complete search history.

(56) References Cited

U.S. PATENT DOCUMENTS 8,348,023 B2   1/2013  Sakashita et al.
8,348,024 B2*  1/2013  Yamaguchi ........... B60T 13/741
                                                188/156

(Continued)

FOREIGN PATENT DOCUMENTS

JP       2010-169248       8/2010
JP       2014-92165        5/2014

*Primary Examiner* — Thomas J Williams
*Assistant Examiner* — Mariano Sy
(74) *Attorney, Agent, or Firm* — Wenderoth, Lind & Ponack, L.L.P.

(57) ABSTRACT

A rotary-to-linear conversion mechanism includes a rotation transmission member, a shaft member threadedly fitted to the rotation transmission member so that a rotation and linear motion of the shaft member are enabled, and a ball-and-ramp mechanism threadedly fitted to the shaft member, which is configured to apply a thrust in the axial direction to a piston through the rotation of the shaft member. The shaft member includes a first thread formed on one end side thereof, and a second thread formed on the other end side thereof. A rotation friction torque of the first thread is larger than a rotation friction torque of the second thread.

9 Claims, 14 Drawing Sheets

(51) Int. Cl.
*F16D 125/48* (2012.01)
*F16D 125/50* (2012.01)

(56) References Cited

U.S. PATENT DOCUMENTS

| | | | | |
|---|---|---|---|---|
| 2001/0023798 | A1* | 9/2001 | Usui | F16D 65/18 188/72.1 |
| 2003/0042084 | A1* | 3/2003 | Kawase | F16D 55/00 188/72.1 |
| 2004/0104087 | A1* | 6/2004 | Takahashi | F16D 65/18 188/156 |
| 2004/0112690 | A1* | 6/2004 | Sekiguchi | F16D 65/18 188/72.7 |
| 2005/0034935 | A1* | 2/2005 | Maehara | F16D 65/18 188/71.9 |
| 2007/0227838 | A1* | 10/2007 | Shigeta | F16D 65/18 188/72.7 |
| 2010/0252375 | A1* | 10/2010 | Chen | F16D 65/18 188/72.1 |
| 2012/0261220 | A1* | 10/2012 | Sakashita | F16D 65/18 188/72.6 |
| 2012/0292141 | A1* | 11/2012 | Takahashi | F16D 65/18 188/72.3 |
| 2014/0034430 | A1* | 2/2014 | Fuse | F16D 55/226 188/72.4 |

* cited by examiner

DISC BRAKE

TECHNICAL FIELD

The present invention relates to a disc brake to be used for applying a brake to a vehicle.

BACKGROUND ART

Some related-art disc brakes include a rotation restriction mechanism (ratchet mechanism) for holding a braking force during application of a parking brake and the like in a planetary gear speed reduction mechanism (refer to Japanese Patent Application Laid-open No. 2010-169248 and Japanese Patent Application Laid-open No. 2014-92165).

However, in the disc brake disclosed in Japanese Patent Application Laid-open No. 2010-169248, a mechanism for holding the braking force is complex, resulting in a fear of a decrease in a manufacturing efficiency of the disc brake.

SUMMARY OF INVENTION

It is an object of the present invention to provide a disc brake including a simplified mechanism of holding a braking force during application of a parking brake and the like, thereby increasing a manufacturing efficiency.

As means for solving the above-mentioned problem, according to one embodiment of the present invention, there is provided a disc brake, including: a pair of pads arranged on both sides of a rotor in an axial direction of the rotor; a piston configured to press one of the pair of pads against the rotor; a caliper main body including a cylinder in which the piston is movably arranged; an electric motor installed on the caliper main body; and a rotary-to-linear conversion mechanism installed on the caliper main body, which is configured to thrust the piston so as to hold the piston in a braking position, in which: the rotary-to-linear conversion mechanism includes: a rotation transmission member to which a rotation of the electric motor is transmitted; a shaft member threadedly fitted to the rotation transmission member so that a rotation and linear motion of the shaft member are enabled; and a ball-and-ramp mechanism threadedly fitted to the shaft member, which is configured to apply a thrust in the axial direction to the piston through the rotation of the shaft member; the shaft member includes a first thread threadedly fitted to the rotation transmission member, which is formed on one end side of the shaft member, and a second thread threadedly fitted to the ball-and-ramp mechanism, which is formed on another end side of the shaft member; and a rotation friction torque of the first thread is larger than a rotation friction torque of the second thread.

According to the one embodiment of the present invention, it is possible to provide the disc brake including the simplified mechanism of holding the braking force during the application of the parking brake and the like, thereby increasing the manufacturing efficiency.

DESCRIPTION OF EMBODIMENTS

Now, a first embodiment of the present invention is described in detail with reference to FIG. 1 to FIG. 12.

Figure 1:
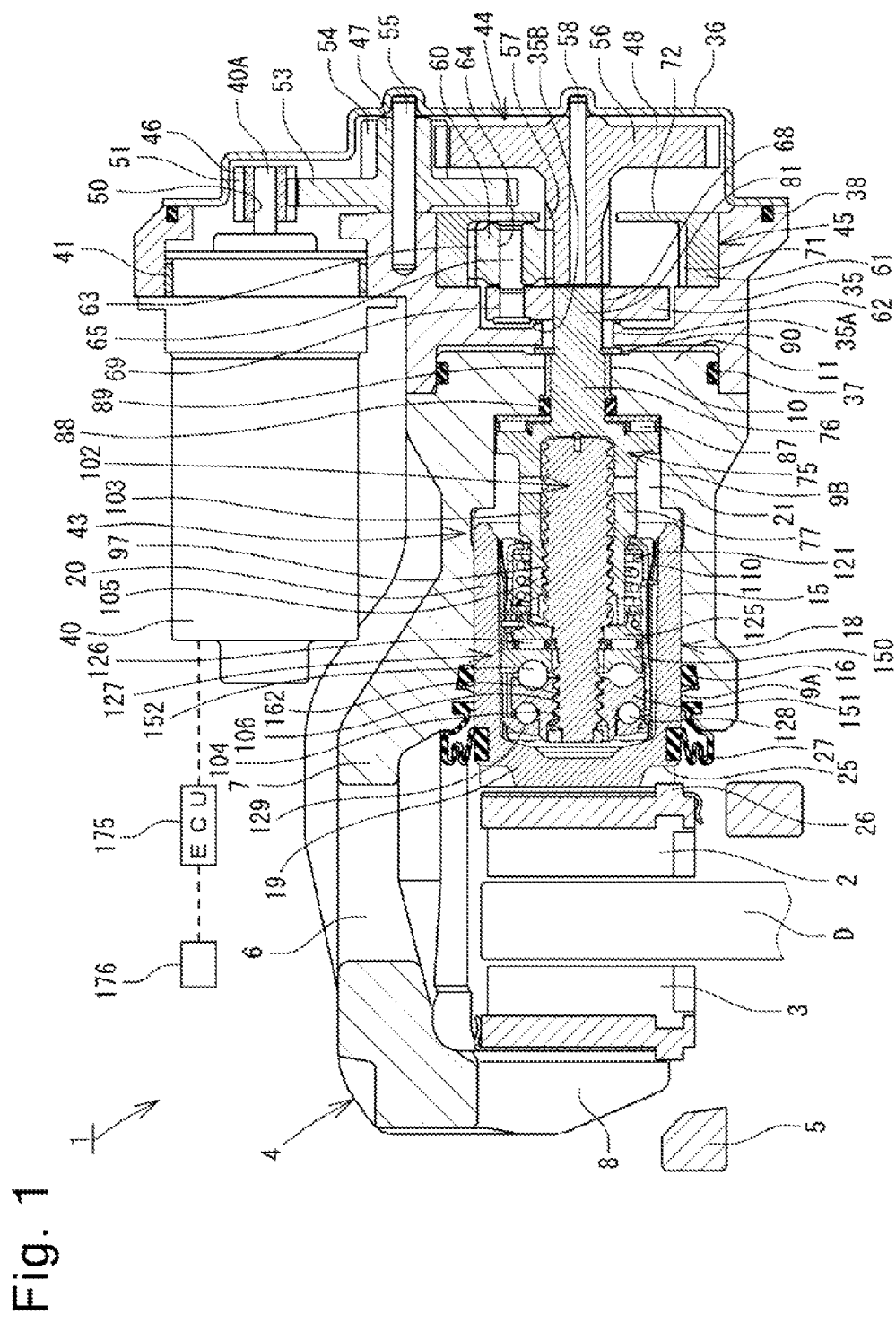
FIG. 1 is a cross sectional view for illustrating a disc brake according to a first embodiment.

As illustrated in FIG. 1, a disc brake 1 according to this embodiment includes a pair of an inner brake pad 2 and an outer brake pad 3 arranged on both sides in an axial direction across a disc rotor D mounted on a rotary unit of a vehicle, and also includes a caliper 4. The disc brake 1 of this embodiment is a floating caliper disc brake. It should be noted that the pair of the inner brake pad 2 and the outer brake pad 3, and the caliper 4 are supported by a bracket 5, which is fixed to a stationary unit such as a knuckle of the vehicle, so as to be movable in the axial direction of the disc rotor D. In the following, for the sake of description, description is appropriately given while assuming that a right side of FIG. 1 is one end side, and a left side of FIG. 1 is the other end side.

A caliper main body 6, which is a main body of the caliper 4, includes a cylinder section 7 arranged on a proximal end part (part opposed to the inner brake pad 2 on a vehicle inboard side) of the caliper main body 6 and a claw section 8 arranged on a distal end part (part opposed to the outer brake pad 3 on a vehicle outboard side) of the caliper main body 6. The cylinder section 7, a cylinder 15 including a larger diameter opening part 9A opening toward the inner brake pad 2 side and a bottom closed by a bottom wall 11 including a hole part 10 on an opposite side thereof. A smaller diameter opening part 9B continuously formed with the larger diameter opening part 9A, and smaller in the diameter than the larger diameter opening part 9A is formed in a part adjacent to the bottom wall 11 inside the cylinder 15. A piston seal 16 is arranged on an inner peripheral surface of the larger diameter opening part 9A.

Figure 2:
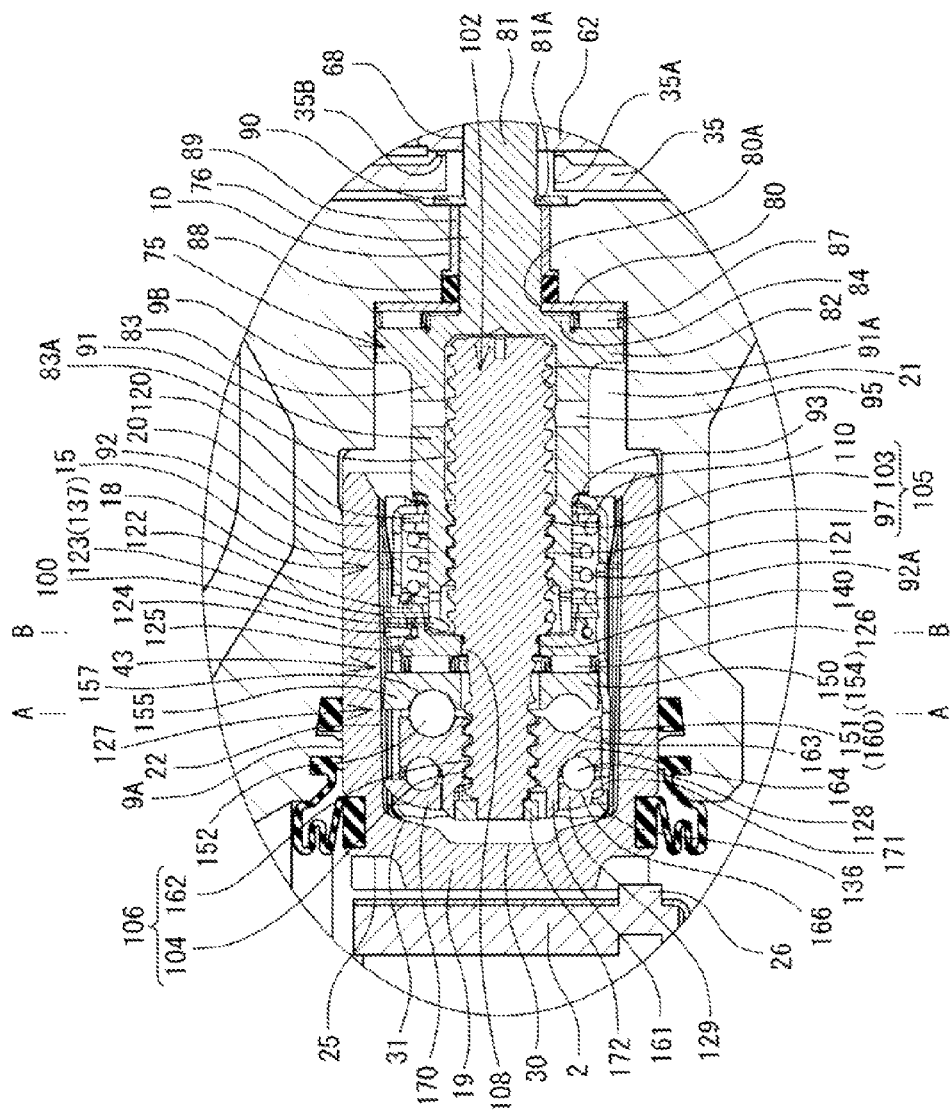
FIG. 2 is an enlarged cross sectional view of a rotary-to-linear conversion mechanism employed in the disc brake according to this embodiment.

As illustrated in FIG. 1 and FIG. 2, a piston 18 is formed into a bottomed cup shape including a bottom part 19 and a cylindrical part 20. The piston 18 is received in the cylinder 15 so that the bottom part 19 is opposed to the inner brake pad 2. The piston 18 is internally installed in the larger diameter opening part 9A of the cylinder 15 so as to be movable in the axial direction in a state in which the piston 18 is in contact with the piston seal 16. A hydraulic chamber 21 is defined by being sealed by the piston seal 16 between the piston 18 and the bottom wall 11 of the cylinder 15. To this hydraulic chamber 21, a hydraulic pressure is supplied through a port (not shown) formed in the cylinder section 7 from a hydraulic pressure source (not shown) such as a master cylinder or a hydraulic control unit. A plurality of rotation restriction lengthwise grooves 22 are formed along a circumferential direction on an inner peripheral surface of the piston 18. According to this embodiment, the rotation restriction lengthwise grooves 22 are formed at twelve locations along the circumferential direction (refer to FIG. 3).

A recess 25 is formed on the bottom part 19 of the piston 18 on an outer peripheral side of the other end surface opposed to the inner brake pad 2. A protrusion 26 formed on a rear surface of the inner brake pad 2 engages with this recess 25, and this engagement prevents the piston 18 from rotating with respect to the cylinder 15, consequently the caliper main body 6. Moreover, a dust boot 27 for preventing foreign substances from entering the cylinder 15 is interposed between the outer peripheral surface of the bottom part 19 of the piston 18 and the inner peripheral surface of the larger diameter opening part 9A of the cylinder 15. On one end surface of the bottom part 19 of the piston 18 opposed to a rotary-to-linear conversion mechanism 43, a circular flat surface part 30 formed at a radial center part thereof and an annular curved surface part 31 extending continuously from the circular flat surface part 30 toward the inner peripheral surface of the piston 18 so as to increase in the diameter toward the one end side are formed.

As illustrated in FIG. 1, a housing 35 is mounted in an airtight manner on the bottom wall 11 side of the cylinder 15. A cover 36 is mounted in an airtight manner on one end opening of the housing 35. It should be noted that the airtightness is maintained by a seal member 37 between the housing 35 and the cylinder section 7. Moreover, the airtightness is maintained by a seal member 38 between the housing 35 and the cover 36. An electric motor 40 is mounted in a sealed manner via a seal member 41 to the housing 35 so as to be arranged side by side with the caliper main body 6. It should be noted that while, according to this embodiment, the motor 40 is arranged outside the housing 35, the housing 35 may be formed so as to cover the motor 40 so as to house the motor 40 inside the housing 35. In this case, the seal member 41 is no longer necessary, and assembly labor can be reduced. Moreover, the housing 35 and the cover 36 may be joined by welding. In this case, the seal member 38 is no longer necessary, and assembly labor can be reduced.

The caliper main body 6 includes the rotary-to-linear conversion mechanism 43 for thrusting the piston 18 and holding the piston 18 in a braking position, and a spur gear multi-stage speed reduction mechanism 44 and a planetary gear speed reduction mechanism 45 for increasing a force of the rotation of the motor 40. The spur gear multi-stage speed reduction mechanism 44 and the planetary gear speed reduction mechanism 45 are housed in the housing 35.

The rotary-to-linear conversion mechanism 43 converts a rotational motion from the spur gear multi-stage speed reduction mechanism 44 and the planetary gear speed reduction mechanism 45, namely the rotation of the motor 40, into a motion in a straight line direction (hereinafter referred to as linear motion), applies a thrust to the piston 18, and holds the piston 18 in the braking position. The rotary-to-linear conversion mechanism 43 is received between the bottom wall 11 of the cylinder 15 and the bottom part 19 of the piston 18, and includes a base nut 75, a pushrod 102, and a ball-and-ramp mechanism 127. The base nut 75 is constructed as a rotation transmission member to which the rotation of the motor 40 is transmitted, is rotatably supported by the cylinder 15, and receives, through intermediation of the spur gear multi-stage speed reduction mechanism 44 and the planetary gear speed reduction mechanism 45, the transmission of the rotational motion of the motor 40. The pushrod 102 includes a first male thread 103 to be threadedly fitted to a female thread 97 of the base nut 75, which is formed on the one end side, and a second male thread 104 formed on the other end side. The pushrod 102 is constructed as a shaft member to be threadedly fitted to the rotation transmission member, and supported so that rotation and linear motion are enabled. The ball-and-ramp mechanism 127 is threadedly fitted to the second male thread 104 of the pushrod 102, and applies the thrust in the axial direction to the piston 18 by the rotation of the pushrod 102. In the rotary-to-linear conversion mechanism 43 according to this embodiment, a first thread fitting part 105 is constructed between the female thread 97 of the base nut 75 and the male thread 103 of the pushrod 102. In the rotary-to-linear conversion mechanism 43 according to this embodiment, a second thread fitting part 106 is constructed between a female thread 162 of a rotary-to-linear ramp 151 of the ball-and-ramp mechanism 127 and the second male thread 104 of the pushrod 102.

The spur gear multi-stage speed reduction mechanism 44 includes a pinion gear 46, a first speed reduction gear 47, and a second speed reduction gear 48. The pinion gear 46 is formed into a cylindrical shape, and includes a hole part 50 press-fitted and fixed to a rotation shaft 40A of the motor 40, and a gear 51 formed on an outer peripheral surface of the hole part 50. The first speed reduction gear 47 integrally includes a larger gear 53, which is larger in diameter and meshes with the gear 51 of the pinion gear 46, and a smaller gear 54, which is smaller in diameter and formed to extend in the axial direction from the larger gear 53. The first speed reduction gear 47 is rotatably supported by a shaft 55 that is supported at one end by the housing 35 and at another end by the cover 36. The second speed reduction gear 48 integrally includes a larger gear 56, which is larger in diameter and meshes with the smaller gear 54 of the first speed reduction gear 47 and a sun gear 57, which is smaller in diameter and formed to extend in the axial direction from the larger gear 56. The sun gear 57 is constructed as a part of the planetary gear speed reduction mechanism 45. The second speed reduction gear 48 is rotatably supported by a shaft 58 that is supported by the cover 36.

The planetary gear speed reduction mechanism 45 includes the sun gear 57, a plurality of (for example, three) planet gears 60, an internal gear 61, and a carrier 62. Each of the planet gears 60 includes a gear 63, which meshes with the sun gear 57 of the second speed reduction gear 48, and a hole part 64 for inserting therethrough a pin 65, which is provided upright from the carrier 62. The three planet gears 60 are arranged equiangularly on a circumference of the carrier 62.

The carrier 62 is formed into a disc shape, and a polygonal hole 68 to which a polygonal pillar 81 of the base nut 75 is fitted is formed at a radial center thereof. The rotational torque can be mutually transmitted between the carrier 62 and the base nut 75 by fitting the polygonal pillar 81, which is provided continuously from a distal end of a columnar part 76 of the base nut 75, to the polygonal hole 68. A plurality of pin holes 69 are formed on an outer peripheral side of the carrier 62. A pin 65 for rotatably supporting each planet gear 60 is press-fitted and fixed to each pin hole 69. The carrier 62 and the each planet gear 60 are restricted in the axial movement by a wall surface 35B projecting on the one end side from a periphery of an opening part 35A of the housing 35 and an annular wall part 72 integrally formed on the second speed reduction gear 48 side of the internal gear 61. According to this embodiment, a relative rotation with respect to the base nut 75 is restricted by the polygonal hole 68 formed in the carrier 62, but a mechanical element capable of transmitting the rotational torque such as a spline or a key may be employed.

The internal gear 61 includes internal teeth 71, which mesh with the gears 63 of the respective planet gears 60, and the annular wall part 72, which is formed on the second speed reduction gear 48 side integrally with and continuously from the internal teeth 71 and is configured to restrict the axial movement of each planet gear 60. The internal gear 61 is press-fitted and fixed to the housing 35.

It should be noted that, according to this embodiment, the spur gear multi-stage speed reduction mechanism 44 and the planetary gear speed reduction mechanism 45 are provided as a speed reduction mechanism for increasing the force of the rotation of the motor 40 in order to acquire the rotational force for thrusting the piston 18, but, as long as this rotational force can be output, any one or both of the speed reduction mechanisms may be omitted.

Figure 5:
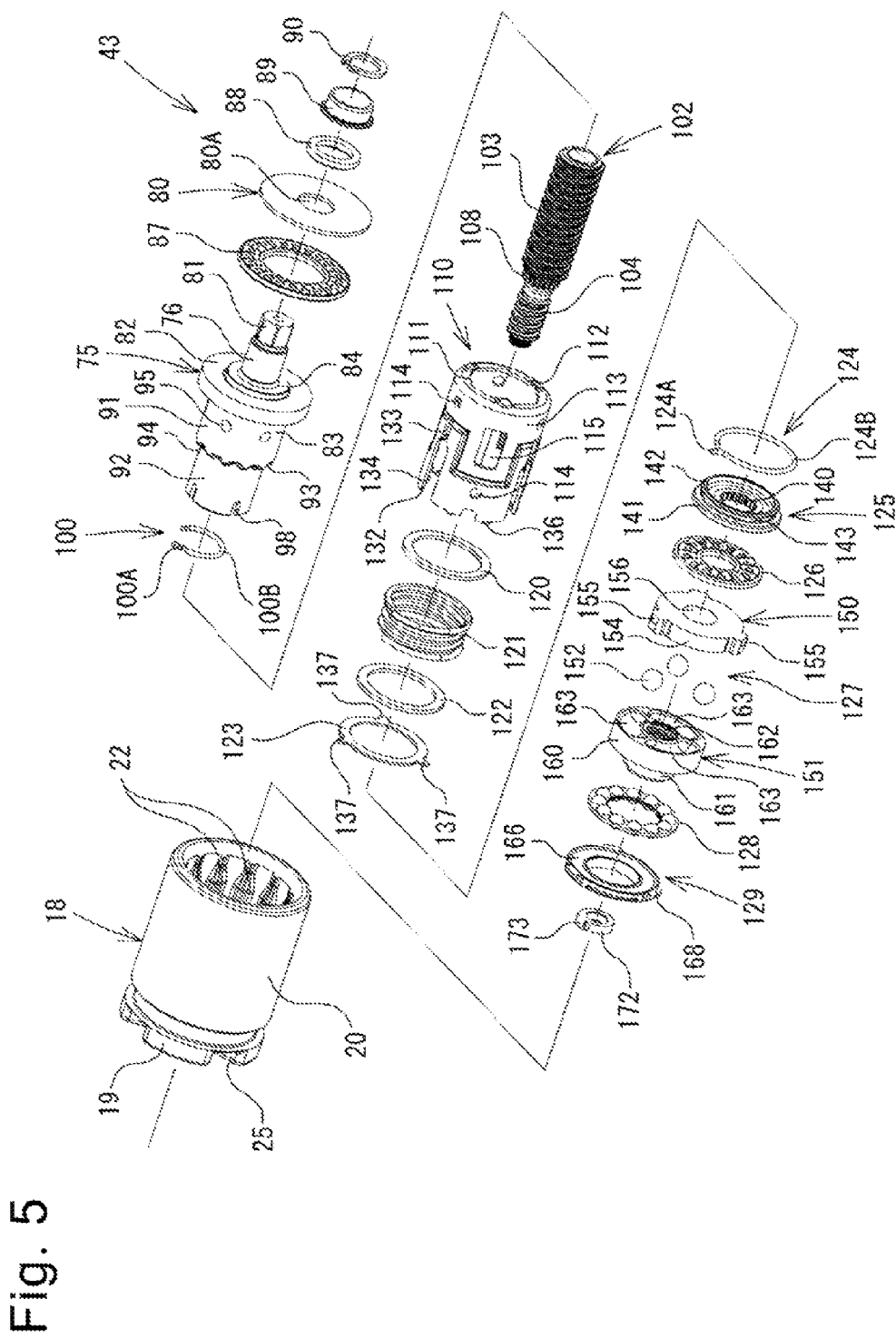
FIG. 5 is an exploded perspective view of the rotary-to-linear conversion mechanism illustrated in FIG. 2.

As illustrated in FIG. 2 and FIG. 5, the base nut 75 includes the columnar part 76, and a nut part 77 integrally formed on the other end of the columnar part 76. A washer 80 is arranged so as to abut against the bottom wall 11 of the cylinder 15. The columnar part 76 of the base nut 75 is inserted through an insertion hole 80A of the washer 80 and the hole part 10 formed through the bottom wall 11 of the cylinder 15. A distal end side of the columnar part 76 is the polygonal pillar part 81 formed by chamfering into a polygon. The polygonal pillar part 81 is inserted through the opening part 35A of the housing 35, and is fitted to the polygonal hole 68 of the carrier 62. According to this embodiment, as illustrated in FIG. 5, the polygonal pillar part 81 is formed into a hexagon, and the polygonal hole 68 is formed by a hexagonal hole. It should be noted that the polygonal pillar part 81 may be made into a polygon such as a triangle, a tetragon, a pentagon, a heptagon, an octagon, and the like in addition to the hexagon, or a shape having two chamfered surfaces. The nut part 77 of the base nut 75 is formed into a bottomed cylindrical shape. The nut part 77 is formed on a proximal end side of the columnar part 76, and is constructed so as to include a circular wall part 82 including one end surface opposed to the bottom wall 11 of the cylinder 15 and a cylindrical part 83 integrally projecting from the other end surface of the circular wall part 82. An outer peripheral surface of the circular wall part 82 is arranged close to the inner wall surface of the smaller diameter opening part 9B of the cylinder 15. A smaller diameter circular wall part 84 projects from a radial center part of one end surface of the circular wall part 82. The columnar part 76 projects from one end surface of the smaller diameter circular wall part 84. An outer diameter of the columnar part 76 is formed so as to be smaller than an outer diameter of the cylindrical part 83 of the nut part 77.

A thrust bearing 87 is arranged between the base nut 75 and the washer 80. The thrust bearing 87 abuts against the circular wall part 82 about the smaller diameter circular wall part 84 of the nut part 77 of the base nut 75. Then, the base nut 75 is rotatably supported by the thrust bearing 87 on the bottom wall 11 of the cylinder 15. A seal member 88 and a sleeve 89 are arranged between the outer peripheral surface of the columnar part 76 of the base nut 75 and the hole part 10 of the bottom wall 11 of the cylinder 15. The seal member 88 and the sleeve 89 are arranged so as to maintain the liquid tightness of the hydraulic chamber 21. An annular groove 81A is formed between the columnar part 76 of the base nut 75 and the polygonal pillar part 81. A snap ring 90 is installed in the annular groove 81A. The snap ring 90 restricts a movement of the base nut 75 in the axial direction of the cylinder 15.

The cylindrical part 83 of the nut part 77 of the base nut 75 includes a larger diameter cylindrical part 91 arranged on the one end side and a smaller diameter cylindrical part 92 arranged on the other end side. An inner peripheral surface 91A of the larger diameter cylindrical part 91 and an inner peripheral surface 92A of the smaller diameter cylindrical part 92 are formed by a hole 83A opening on the other end of the cylindrical part 83. One end of the larger diameter cylindrical part 91 is integrally connected to the circular wall part 82. An annular step surface 93 opposed to the bottom part 19 of the piston 18 is formed between the outer peripheral surface of the larger diameter cylindrical part 91 and the outer peripheral surface of the smaller diameter cylindrical part 92. The annular step surface 93 includes a plurality of recesses and protrusions 94 protruding in the axial direction of the base nut 75, and is formed into a waved-shape continuous along the circumferential direction. A plurality of through holes 95 extending in the radial direction of the larger diameter cylindrical part 91 and passing therethrough are formed in the larger diameter cylindrical part 91. The plurality of through holes 95 are formed at intervals in the circumferential direction. A female thread 97 is formed on the inner peripheral surface 92A of the smaller diameter cylindrical part 92 of the nut part 77. A plurality of lock grooves 98 (for example, at four locations) are respectively formed at intervals in the circumferential direction on the other end surface of the peripheral wall part of the smaller diameter cylindrical part 92 (refer to FIG. 4 and FIG. 5).

Figure 4:
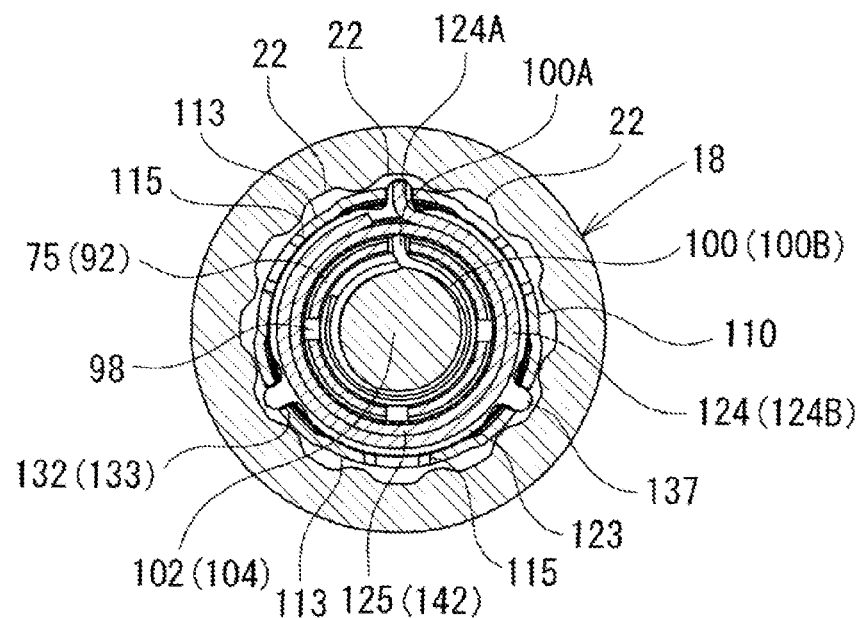
FIG. 4 is a cross sectional view taken along the line B-B of the rotary-to-linear conversion mechanism illustrated in FIG. 2.

As illustrated in FIG. 2, FIG. 4, and FIG. 5, a distal end part 100A of a first spring clutch 100 is fitted to any one of the respective lock grooves 98. The first spring clutch 100 includes the distal end part 100A directed outward in the radial direction, and a coil part 100B wound once starting from the distal end part 100A. Then, the distal end part 100A is fitted to any one of the respective lock grooves 98, and the coil part 100B is wound on an outer periphery on the other end side of the first male thread 103 of the pushrod 102. The first spring clutch 100 is configured to apply a rotation resistance torque against a rotational direction when the pushrod 102 moves toward the bottom wall 11 side of the cylinder 15 with respect to the base nut 75, namely a rotational direction upon release for releasing the parking brake, and to permit a rotation in a rotational direction when the pushrod 102 moves toward the bottom part 19 side of the piston 18 with respect to the base nut 75, namely a rotational direction upon application for applying the parking brake. In other words, the first spring clutch 100 is constructed as a first one-way clutch for applying the rotational resistance against the rotation in the one direction.

In the hole 83A of the nut part 77 of the base nut 75, the one end side of the pushrod 102 is arranged. The first male thread 103 to be threadedly fitted to the female thread 97 of the smaller diameter cylindrical part 92 of the base nut 75 so as to construct the first thread fitting part 105 is formed on the one end side of the pushrod 102. The first thread fitting part 105 is constructed so that the base nut 75 is not rotated by an axial load transmitted from the piston 18 to the pushrod 102, and is thus 0 or less in the backward efficiency, that is, constructed as a thread fitting part large in the irreversibility.

On the other hand, on the other end side of the pushrod 102, the second male thread 104 to be threadedly fitted to the female thread 162 formed on the rotary-to-linear ramp 151 of the ball-and-ramp mechanism 127 so as to construct the second thread fitting part 106 is formed. The second thread fitting part 106 is constructed so that the pushrod 102 is not rotated by an axial load transmitted from the piston 18 to the rotary-to-linear ramp 151, and is thus 0 or less in the backward efficiency, that is, constructed as a thread fitting part large in the irreversibility.

The pushrod 102 includes a spline shaft 108 between the first male thread 103 and the second male thread 104. An outer diameter of the first male thread 103 is formed so as to be larger than an outer diameter of the second male thread 104. The outer diameter of the first male thread 103 is formed so as to be larger than an outer diameter of the spline shaft 108. The other end surface of the pushrod 102 is opposed to the circular flat surface part 30 of the bottom part 19 of the piston 18.

Between the outer peripheral surface of the smaller diameter cylindrical part 92 of the base nut 75 and the inner peripheral surface of the cylindrical part 20 of the piston 18, a retainer 110 is supported so as to be axially movable. The retainer 110 includes an annular wall part 111 on the one end side opposed to the annular step surface 93 of the base nut 75, and is formed into approximately a cylindrical shape as a whole. On one end surface of the annular wall part 111, a plurality of protrusions 112 are formed at intervals along the circumferential direction. A recessed surface 113 is formed on the one end side of the outer peripheral surface of the retainer 110. In an outer peripheral wall including the recessed surface 113 of the retainer 110, a plurality of circular through holes 114 are formed. According to this embodiment, three circular through holes 114 are formed at intervals in the circumferential direction within a range of the recessed surface 113, and three circular through holes 114 are formed at intervals in the circumferential direction through the outer peripheral wall on the other end side other than the recessed surface 113 (refer to FIG. 3 and FIG. 5). Within the range of the recessed surface 113 in the outer peripheral wall of the retainer 110, a plurality of rectangular through holes 115 are formed. According to this embodiment, three rectangular through holes 115 are formed at intervals in the circumferential direction (refer to FIG. 4).

In the retainer 110, in the order from the one end side, a one-end-side washer 120, a coil spring 121, an other-end-side washer 122, a support plate 123, a second spring clutch 124, a rotation member 125, a thrust bearing 126, the ball-and-ramp mechanism 127, a thrust bearing 128, and an annular pressure plate 129 are arranged. The one-end-side washer 120 is arranged so as to abut against the other end surface of the annular wall part 111 of the retainer 110.

The coil spring 121 is interposed between the one-end-side washer 120 and the other-end-side washer 122. The coil spring 121 biases the one-end-side washer 120 and the other-end-side washer 122 in a direction to separate the one-end-side washer 120 and the other-end-side washer 122 from each other. On the other end surface of the peripheral wall part of the retainer 110, a plurality of (such as three) lock grooves 132 having a predetermined depth are formed at intervals in the circumferential direction. The lock groove 132 includes a narrow lock groove 133 located on the one end side of the retainer 110 and a wide lock groove 134 located on the other end side thereof. The wide lock groove 134 is formed to have a larger depth dimension than the narrow lock groove 133. Or the other end part of the retainer 110 opposed to the bottom part 19 of the piston 18, a plurality of pawl parts 136 (for example, at six locations) extending radially inward are formed. After components such as the one-end-side washer 120, the coil spring 121, the other-end-side washer 122, the support plate 123, the second spring clutch 124, the rotation member 125, the thrust bearing 126, the ball-and-ramp mechanism 127, the thrust bearing 128, and the annular pressure plate 129 are received in predetermined positions in the retainer 110, the respective pawl parts 136 are bent toward reception recesses 171 of the annular pressure plate 129 of the retainer 110 so as to integrally arranging the above-mentioned components in the retainer 110. It should be noted that the one-end-side washer 120 and the other-end-side washer 122 may be omitted.

The annular support plate 123 is arranged so as to abut against the other end surface of the other-end-side washer 122. A plurality of projecting pieces 137 (for example, at three locations) are formed at intervals along the circumferential direction on an outer peripheral surface of the support plate 123. Each of the projecting pieces 137 is fitted to the narrow lock groove 133 of the retainer 110. As a result, the support plate 123 is supported so as to be unrotatable relative to the retainer 110, but axially movable relative to the retainer 110. It should be noted that the projecting piece 137 may be increased in the width so as to engage with the rotation restriction lengthwise groove 22 formed on the inner peripheral surface of the piston 18.

In the retainer 110, the rotation member 125 is rotatably supported on the other end side of the support plate 123. The rotation member 125 includes a larger diameter annular part 141 including a spline hole 140 and a smaller diameter cylindrical part 142 projecting integrally from one end surface of the larger diameter annular part 141. One end of the smaller diameter cylindrical part 142 abuts against the other end surface of the support plate 123. An annular groove 143 is formed on an outer peripheral surface of the smaller diameter cylindrical part 142. The pushrod 102 is arranged in the rotation member 125. The spline hole 140 of the larger diameter annular part 141 of the rotation member 125 is coupled by means of the spline to the spline shaft 108 of the pushrod 102. As a result, the rotation member 125 and the pushrod 102 can mutually transmit a rotational torque to each other, and can relatively slide in the axial direction. It should be noted that the spline is used to stop the rotation, but other known rotation stopping mechanical elements such as a key fit and a D slot may be used. Moreover, fixing such as press-fitting may be used instead of the axial slide.

The second spring clutch 124 is wound in the annular groove 143 formed on the smaller diameter cylindrical part 142 of the rotation member 125. The second spring clutch 124 includes, as in the first spring clutch 100, a distal end part 124A directed outward in the radial direction, and a coil part 124E wound once starting from the distal end part 124A. The distal end part 124A is fitted to the narrow lock groove 133 of the retainer 110, and the coil part 1243 is wound in the annular groove 143 formed on the outer peripheral surface of the smaller diameter cylindrical part 142 of the rotation member 125. The second spring clutch 124 is configured to apply a rotation resistance torque against a rotational direction (rotational direction upon the application) when the rotation member 125 (pushrod 102) moves toward the bottom part 19 side of the piston 18 with respect to the retainer 110, and to permit a rotation in a rotational direction (rotational direction upon the release) when the rotation member 125 moves toward the bottom wall 11 side of the cylinder 15. In other words, the second spring clutch 124 is constructed as a second one-way clutch for applying the rotational resistance against the rotation in the one direction.

The rotation resistance torque upon the application of the second spring clutch 124 is set to be larger than the rotation resistance torque of the first thread fitting part 105 between the first male thread 103 of the pushrod 102 and the female thread 97 of the base nut 75. The ball-and-ramp mechanism 127 is arranged on the other end side of the rotation member 125 through intermediation of the thrust bearing 126. The rotation member 125 is rotatably supported with respect to the ball-and-ramp mechanism 127 through intermediation of the thrust bearing 126.

Figure 3:
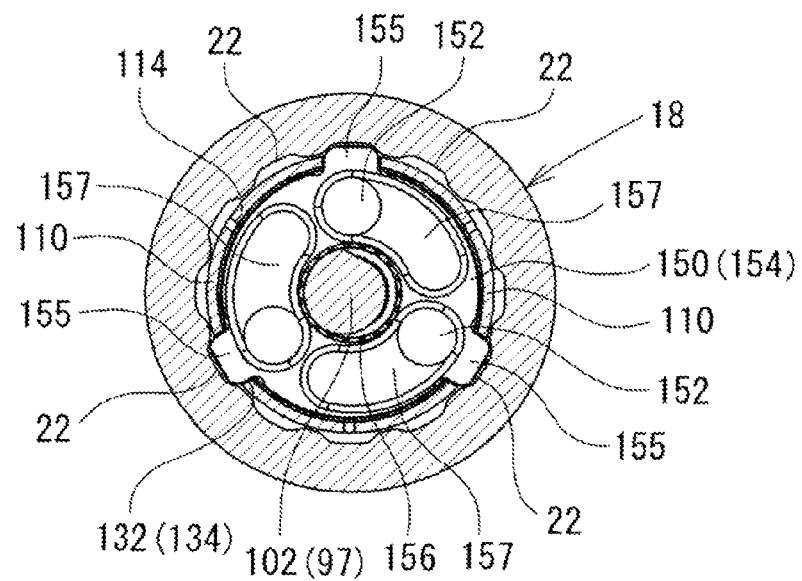
FIG. 3 is a cross sectional view taken along the line A-A of the rotary-to-linear conversion mechanism illustrated in FIG. 2.

As illustrated in FIG. 2, FIG. 3, and FIG. 5, the ball-and-ramp mechanism 127 includes a fixed ramp 150, a rotary-to-linear ramp 151, and respective balls 152 interposed between the fixed ramp 150 and the rotary-to-linear ramp 151. The fixed ramp 150 is arranged on the other end side of the rotation member 125 across the thrust bearing 126. The fixed ramp 150 includes a fixed plate 154 in a disc shape, and a plurality of protrusions 155 projecting (for example, at three locations) at intervals along the circumferential direction from an outer peripheral surface of the fixed plate 154. In the fixed plate 154, an insertion hole 156 through which the pushrod 102 is inserted is formed at a radial center part thereof. The respective protrusions 155 of the fixed ramp 150 are fitted to the wide lock grooves 134 of the respective lock grooves 132 of the retainer 110, and are fitted to the plurality of rotation restriction lengthwise grooves 22 formed on the inner peripheral surface of the piston 18, to thereby support the fixed ramp 150 so as to be unrotatable relative to the piston 18, but axially movable relative to the piston 18.

It should be noted that, as the structure of supporting the fixed ramp 150 so as to be unrotatable relative to the piston 18, but axially movable relative to, there may be provided such a structure that a plurality of flat surface parts are formed at intervals in the circumferential direction on the outer peripheral surface of the fixed ramp 150, a plurality of flat surface parts corresponding to the respective flat surface parts of the fixed ramp 150 are also formed on the inner peripheral surface of the piston 18, and these flat surface parts are brought into abutment against each other so as to restrict the rotation of the fixed ramp 150 with respect to the piston 18. On the other end surface of the fixed plate 154, a plurality of ball grooves 157 (for example, at three or four locations) each extending in an arc shape at a predetermined inclined angle along the circumferential direction, and having a cross section in the arc shape in the radial direction are formed.

The rotary-to-linear ramp 151 includes an annular rotary-to-linear plate 160, and a cylindrical part 161 integrally projecting from a radial center part of the other end surface of the rotary-to-linear plate 160. The female thread 162 to which the second male thread 104 of the pushrod 102 is threadedly fitted is formed on an inner peripheral surface extending from the rotary-to-linear plate 160 to the cylindrical part 161. On a surface of the rotary-to-linear plate 160 opposed to the fixed plate 154 of the fixed ramp 150, a plurality of ball grooves 163 (for example, at three or four locations) each extending in an arc shape at a predetermined inclined angle along the circumferential direction, and having a cross section in the arc shape in the radial direction are formed. It should be noted that each of the ball grooves 157 of the fixed ramp 150 and each of the ball grooves 163 of the rotary-to-linear ramp 151 may be configured so that a dent is formed in the course of the ramp along the circumferential direction, or the ramp may be changed in the course.

The balls 152 are interposed between the ball grooves 163 of the rotary-to-linear ramp 151 (rotary-to-linear plate 160) and the ball grooves 157 of the fixed ramp 150 (fixed plate 154), respectively. In the ball-and-ramp mechanism 127, when a rotational torque is applied to the rotary-to-linear ramp 151, the balls 152 roll between the ball grooves 163 of the rotary-to-linear plate 160 and the ball grooves 157 of the fixed plate 154, respectively, and thus a rotational difference is generated between the rotary-to-linear plate 160 and the fixed plate 154, to thereby fluctuate a relative axial distance between the rotary-to-linear plate 160 and the fixed plate 154.

Moreover, an annular ball groove 164 is formed around the cylindrical part 161 on the other end surface of the rotary-to-linear plate 160. The annular pressure plate 129 is arranged on the other end side of the rotary-to-linear plate 160 through intermediation of the thrust bearing 128. An annular ball groove 166 is also formed on one end surface of the annular pressure plate 129. Then, between the annular ball groove 164 of the rotary-to-linear plate 160 and the annular ball groove 166 of the annular pressure plate 129, the thrust bearing 128 in which a plurality of balls are rotatably supported in the circumferential direction is arranged. The cylindrical part 161 of the rotary-to-linear plate 160 is inserted through the annular pressure plate 129. On the outer peripheral surface of the annular pressure plate 129, a plurality of projecting protrusions 168 are formed at intervals along the circumferential direction. The respective protrusions 168 are fitted to the wide lock grooves 134 of the respective lock grooves 132 of the retainer 110, and are fitted to the plurality of rotation restriction lengthwise grooves 22 formed on the inner peripheral surface of the piston 18, to thereby support the annular pressure plate 129 so as to be unrotatable relative to the piston 18, but axially movable relative to.

The rotary-to-linear ramp 151 of the ball-and-ramp mechanism 127 is rotatably supported by the annular pressure plate 129 through intermediation of the thrust bearing 128. The other end surface of the annular pressure plate 129 is opposed to the annular curved surface part 31 of the bottom part 19 of the piston 18. On the other end surface of the annular pressure plate 129, a curved pressure part 170 curved toward the one end side from the radial center to an outer peripheral end part is formed. This annular pressure plate 129 is constructed so as to abut against the annular curved surface part 31 formed on the bottom part 19 of the piston 18 so as to press the piston 18. On the other end surface of the annular pressure plate 129, the reception recesses 171 for receiving the pawl parts 136 bent inward of the retainer 110 are respectively formed on outer peripheral parts between the respective protrusions 168.

As illustrated in FIG. 2 and FIG. 5, on the distal end of the second male thread 104 of the pushrod 102, a retainer ring 172 is integrally fixed. The retainer ring 172 is arranged inside the cylindrical part 161 of the rotary-to-linear ramp 151 so as to suppress a relative rotational angle between the pushrod 102 and the rotary-to-linear ramp 151 to be a certain angle or less. On a part of the retainer ring 172, a protrusion 173 is formed, and the protrusion 173 is fitted to a wide recess of the cylindrical part 161. In a non-braking state, the protrusion 173 is shifted on one side in the recess, and, in a braking state, the protrusion 173 is shifted on the other side. As a result, in any of the cases, the protrusion 173 and the recess abut against each other in the circumferential direction. As a result, the relative rotational angle between the retainer ring 172 and the pushrod 102 is restricted. Therefore, in the application state, the retainer ring 172 is prevented from falling off from the pushrod 102 by a thrust of the rotary-to-linear ramp 151. It should be noted that the rotation resistance torque of the second thread fitting part 106 between the second male thread 104 of the pushrod 102 and the female thread 162 of the rotary-to-linear ramp 151 of the ball-and-ramp mechanism 127 is set to be smaller than a rotational resistance that is a sum of the rotation resistance torque against the release direction of the pushrod 102 with respect to the base nut 75, which is caused by the first spring clutch 100, and the rotation resistance torque of the first thread fitting part 105 between the first male thread 103 of the pushrod 102 and the female thread 97 of the base nut 75.

As illustrated in FIG. 1, an ECU 175 constructed of an electronic control device serving as control means for controlling the drive of the motor 40 is connected to the motor 40. A parking switch 176 to be operated for instructions to actuate and release the parking brake is connected to the ECU 175. Moreover, the ECU 175 can be actuated based on the signal from the vehicle side (not shown), independently of the operation of the parking switch 176.

Next, operation of the disc brake 1 according to this embodiment are described. First, operations during braking of the disc brake 1 serving as a general hydraulic brake through operations of a brake pedal (not shown) are described.

When a driver depresses the brake pedal, a hydraulic pressure in accordance with a pedaling force of the brake pedal is supplied from the master cylinder (not shown) to the hydraulic chamber 21 inside the caliper 4 through a hydraulic circuit (not shown). Thus, the piston 18 moves forward from its original position in a non-braking state (moves in the leftward direction in FIG. 1) while elastically deforming the piston seal 16, to thereby press the inner brake pad 2 against the disc rotor D. Then, the caliper main body 6 moves in the rightward direction in FIG. 1 relative to the bracket 5 due to a reaction force against the pressing force of the piston 18, to thereby press the outer brake pad 3 mounted on the claw section 8 against the disc rotor D. As a result, the disc rotor D is squeezed between the pair of the inner and outer brake pads 2 and 3 so that a frictional force is generated, and a braking force for the vehicle is therefore generated.

Then, when the driver releases the brake pedal, the supply of the hydraulic pressure from the master cylinder is interrupted so that the hydraulic pressure inside the hydraulic chamber 21 is decreased. Thus, the piston 18 moves backward to the original position due to a restoring force generated through the elastic deformation of the piston seal 16. As a result, the braking force is released. Incidentally, when a movement amount of the piston 18 increases as the inner and outer brake pads 2 and 3 wear, and exceeds a limit of the elastic deformation of the piston seal 16, a slip occurs between the piston 18 and the piston seal 16. Even when the brake pads 2 and 3 are worn, an original position of the piston 18 moves with respect to the caliper main body 6 as a result of the slip, and the pad clearances are adjusted to be constant.

Figure 8:
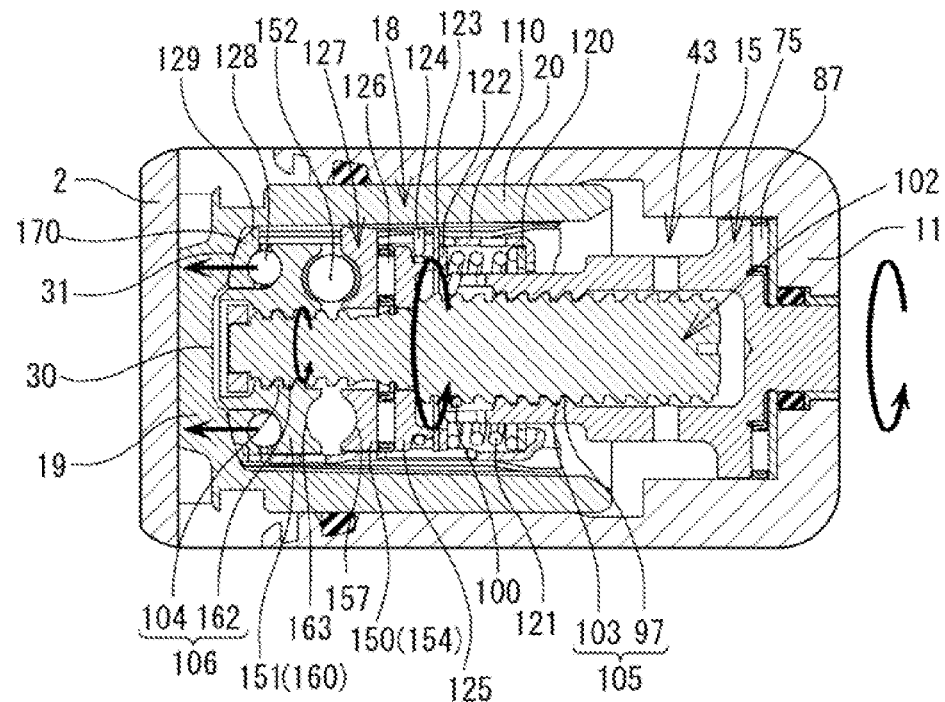
FIG. 8 is a cross sectional view for illustrating stepwise the action when the parking brake is operated.
Figure 9:
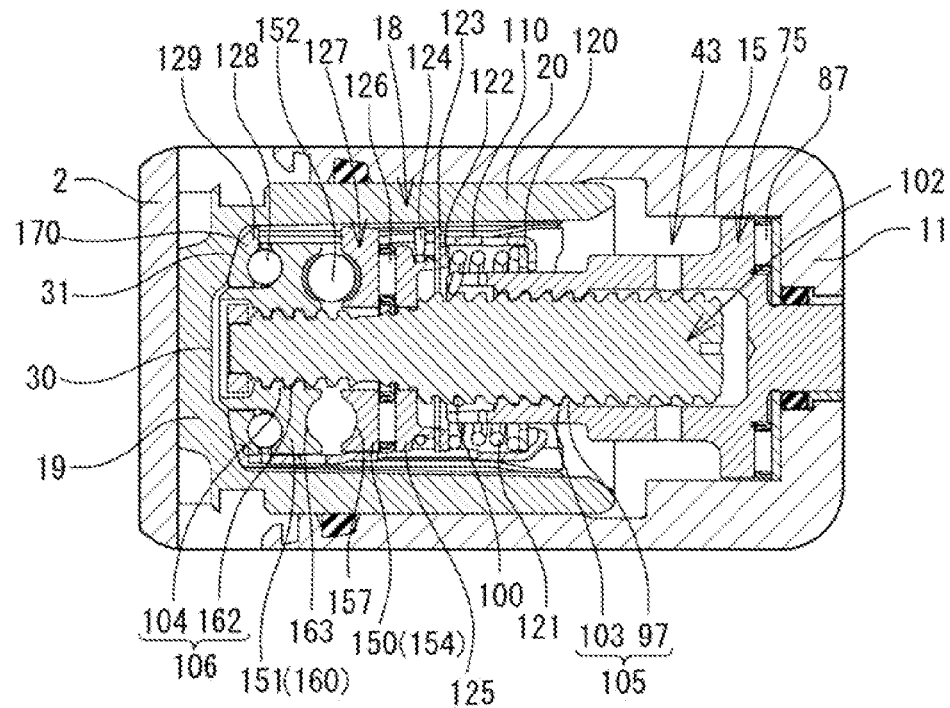
FIG. 9 is a cross sectional view for illustrating stepwise the action when the parking brake is operated.
Figure 10:
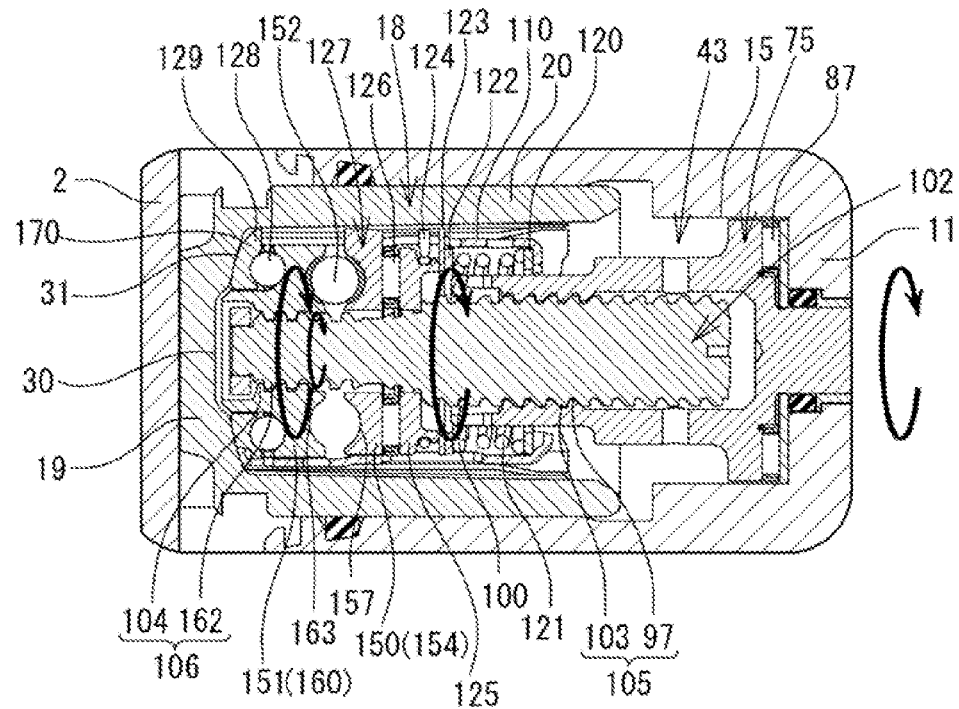
FIG. 10 is a cross sectional view for illustrating stepwise an action when the parking brake is released.
Figure 11:
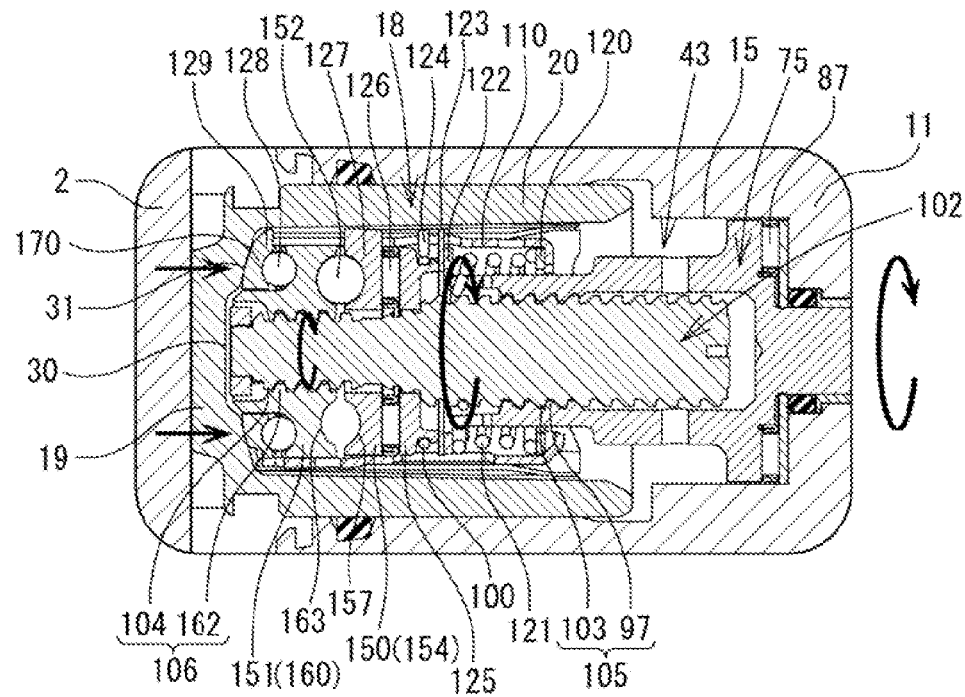
FIG. 11 is a cross sectional view for illustrating stepwise the action when the parking brake is released.
Figure 12:
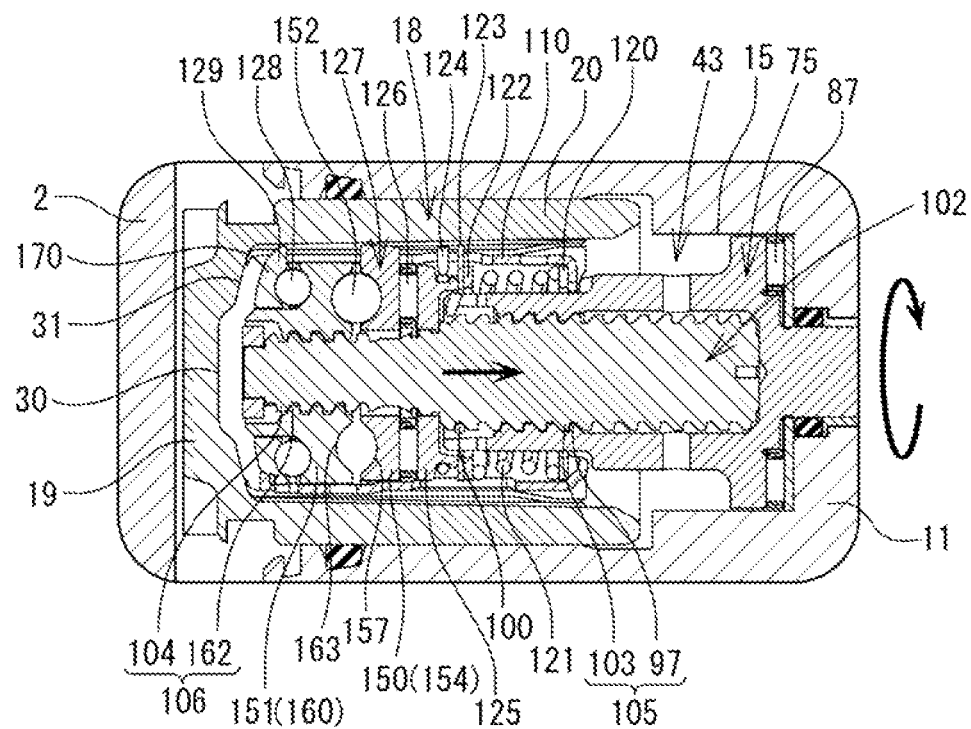
FIG. 12 is a cross sectional view for illustrating stepwise the action when the parking brake is released.

Now, referring to FIG. 6 to FIG. 12 and also FIG. 1 properly, description is given of an operation as a parking brake for maintaining the stop state of the vehicle. It should be noted that FIG. 6 to FIG. 9 illustrate stepwise an operation when the parking brake is applied, and FIG. 10 to FIG. 12 illustrate stepwise an operation when the parking brake is released.

First, when the parking switch 176 is operated in the release state of the parking brake so as to operate (apply) the parking brake, the ECU 175 drives the motor 40 so as to rotate, through intermediation of the spur gear multi-stage speed reduction mechanism 44, the sun gear 57 of the planetary gear speed reduction mechanism 45. Through the rotation of the sun gear 57, the carrier 62 rotates through intermediation of the planet gears 60. Then, the rotational torque, that is, the rotation of the motor 40 is transmitted from the carrier 62 to the base nut 75.

Figure 6:
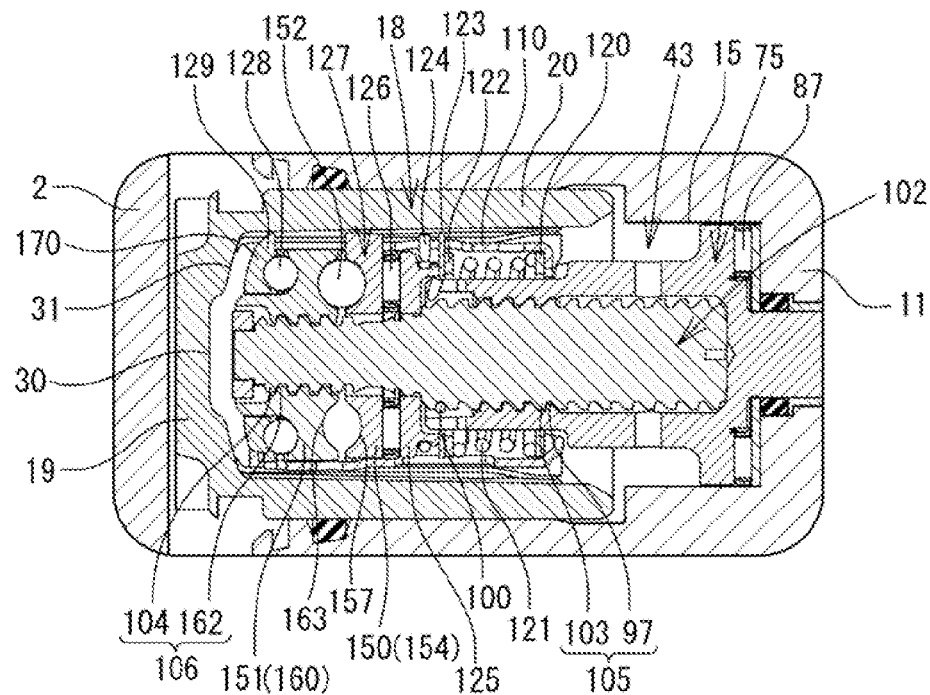
FIG. 6 is a cross sectional view for illustrating stepwise an action when a parking brake is operated.
Figure 7:
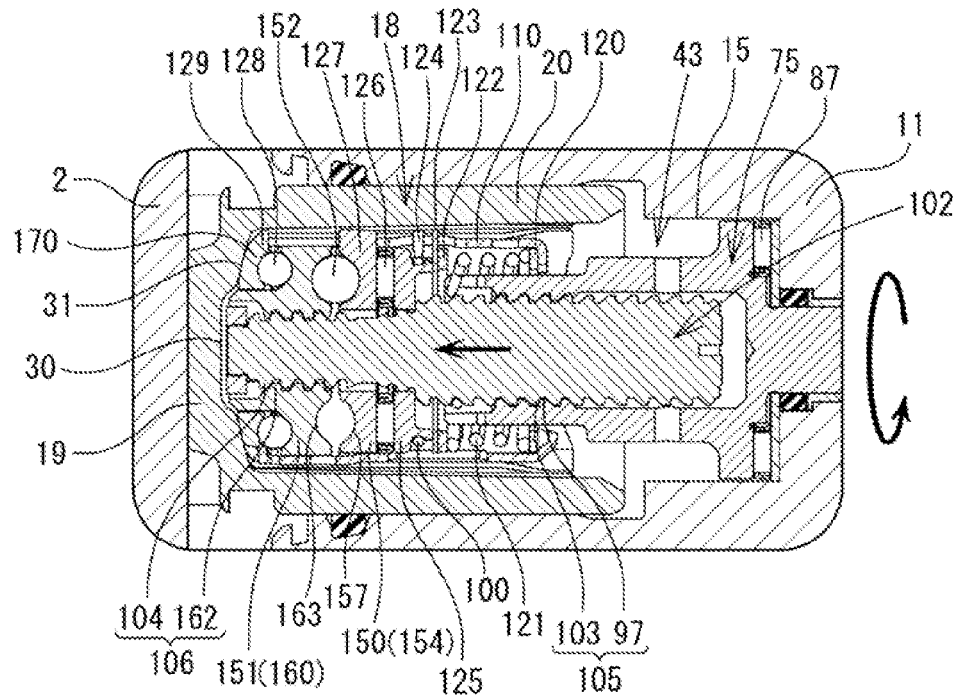
FIG. 7 is a cross sectional view for illustrating stepwise the action when the parking brake is operated.

Then, due to the rotation of the base nut 75 in the application direction, from an initial position illustrated in FIG. 6 (state in which a predetermined gap exists between the annular pressure plate 129 and the bottom part 19 of the piston 18), as illustrated in FIG. 7, the first thread fitting part 105 between the female thread 97 of the base nut 75 and the first male thread 103 of the pushrod 102 relatively rotates, in other words, only the base nut 75 rotates in the application direction, and, as a result, the pushrod 102 moves forward along the axial direction toward the bottom part 19 side of the piston 18. On this occasion, the pushrod 102 does not rotate along with the base nut 75 because the rotation resistance torque against the application direction of the rotation member 125 (pushrod 102) with respect to the retainer 110, which is caused by the second spring clutch 124, is set to be larger than the rotation resistance torque caused by the first thread fitting part 105 between the first male thread 103 of the pushrod 102 and the female thread 97 of the base nut 75, and the rotation in the application direction of the cylinder 15 of the pushrod 102 with respect to the base nut 105, which is caused by the first spring clutch 100, is permitted.

As a result, as illustrated in FIG. 7, along with the pushrod 102, the retainer 110 and the respective components in the retainer 110 such as the one-end-side washer 120, the coil spring 121, the other-end-side washer 122, the support plate 123, the second spring clutch 124, the rotation member 125, the thrust bearing 126, the ball-and-ramp mechanism 127, the thrust bearing 128, and the annular pressure plate 129 integrally move forward in the axial direction to the bottom part 19 side of the piston 18, and the curved pressure part 170 of the annular pressure plate 129 abuts against the annular curved surface part 31 of the bottom part 19 of the piston 18. As a result of this abutment, the piston 18 moves forward, and the one end surface of the bottom part 19 of the piston 18 abuts against the inner brake pad 2.

Further, when the rotational drive of the motor 40 in the application direction continues, the movement of the pushrod 102 causes the piston 18 to start pressing the disc rotor D through intermediation of the brake pads 2 and 3. When generation of this pressing force is started, an axial force corresponding to a reaction force against the pressing force increases the rotation resistance torque in the first thread fitting part 105 between the first male thread 103 of the pushrod 102 and the female thread 97 of the base nut 75, resulting in an increase in a rotational torque required to move the pushrod 102 forward. Then, the rotation resistance torque of the first thread fitting part 105, which is the required rotational torque, exceeds the rotation resistance torque of the second spring clutch 124. As a result, as illustrated in FIG. 8, as the base nut 75 rotates, the pushrod 102 starts rotating in the application direction along with the rotation member 125. In other words, the pushrod 102 rotates along with the base nut 75. Then, the rotation resistance torque in the second thread fitting part 106 between the second male thread 104 of the pushrod 102 and the female thread 162 of the rotary-to-linear ramp 151 of the ball-and-ramp mechanism 127 is also increased by the reaction force against the pressing force applied to the disc rotor D, and hence the rotational torque in the application direction of the pushrod 102 is transmitted to the rotary-to-linear ramp 151 of the ball-and-ramp mechanism 127 through intermediation of the second thread fitting part 106.

Then, while the rotary-to-linear ramp 151 of the ball-and-ramp mechanism 127 is rotating in the application direction, the rotary-to-linear ramp 151 and the fixed ramp 150 separate from each other against the biasing force of the coil spring 121 by the rolls the respective balls 152. As a result, the curved pressure part 170 of the annular pressure plate 129 further presses the annular curved surface part 31 of the bottom part 19 of the piston 18, and the pressing forces of the inner and outer brake pads 2 and 3 against the disc rotor D increase. On this occasion, a force, which is a sum of the thrust generated in the second thread fitting part 106 and the thrust generated in the ball-and-ramp mechanism 127, is applied to the bottom part 19 of the piston 18.

It should be noted that, in this embodiment, at the beginning of the application, the first thread fitting part 105, on this occasion, the first thread fitting part 105 between the male thread of the pushrod 102 and the female thread 97 of the base nut 75 relatively rotates so that the pushrod 102 moves forward so as to move the piston 18 forward and to acquire the pressing force to the disc rotor D. Therefore, even when the position of the piston 18 with respect to the cylinder 11 changes due to secular wears of the pair of inner and outer brake pads 2 and 3 when the first thread fitting part 105 operates, the original position of the pushrod 102 with respect to the piston 18 can be adjusted.

On this occasion, the lead L (lead of the rotary-to-linear ramp 151 when the rotary-to-linear ramp 151 rotates once) when the ball-and-ramp mechanism 127 and the second thread fitting part 106 operate is represented by the following equation.

$$L = LSCREW \times LB\&R / (LSCREW + LB\&R)$$

It should be noted that LSCREW is a lead of the second thread fitting part 106 between the second male thread 104 of the pushrod 102 and the female thread 162 of the rotary-to-linear ramp 151. Moreover, LB&R is a lead of the respective ball grooves 163 of the rotary-to-linear ramp 151 and the respective ball grooves 157 of the fixed ramp 150. As a result, a boosting ratio (thrust to the rotational torque) can be set to an appropriate value depending on a vehicle on which the disc brake 1 is installed based on the respective values of the leads.

Then, the ECU 175 drives the motor 40 until the pressing force applied from the pair of the inner and outer brake pads 2 and 3 to the disc rotor D reaches a predetermined value, for example, until the current value of the motor 40 reaches a predetermined value. After that, when it is detected that the pressing force applied to the disc rotor D reaches the predetermined value based on the detection that the current value of the motor 40 reaches the predetermined value, the ECU 175 stops energizing the motor 40. Then, the rotation in the application direction of the pushrod 102 stops, and hence the rotation of the rotary-to-linear ramp 151 of the ball-and-ramp mechanism 127 stops.

Then, as illustrated in FIG. 9, the reaction force against the pressing force from the disc rotor D acts on the rotary-to-linear ramp 151. The second thread fitting part 106 between the second male thread 104 of the pushrod 102 and the female thread 162 of the rotary-to-linear ramp 151 of the ball-and-ramp mechanism 127 is constructed as the thread fitting part that does not operate inversely between the pushrod 102 and the rotary-to-linear ramp 151 as described above. Moreover, the first thread fitting part 105 between the first male thread 103 of the pushrod 102 and the female thread 97 of the base nut 75 is also constructed as the thread fitting part that does not operate inversely between the pushrod 102 and the base nut 75 as described above. Further, the rotation resistance torque against the release direction with respect to the base nut 75 is applied to the pushrod 102 by the first spring clutch 100. Thus, the rotary-to-linear ramp 151 of the ball-and-ramp mechanism 127 does not rotate, and is maintained in the stop state, and the piston 18 is held at the braking position. As a result, the braking force is held, and the operation of the parking brake is completed. In this state, the reaction force against the pressing force from the disc rotor D is transmitted to the bottom wall 11 of the cylinder 15 through intermediation of the ball-and-ramp mechanism 127, the pushrod 102, the base nut 75, and the thrust bearing 87, to thereby serve as the holding force for the piston 18. According to this embodiment, only the thrust generated by the ball-and-ramp mechanism 127 acts on the thrust bearing 126 for which only a thrust bearing relatively small in the diameter needs to be used, and thus durability of the disc brake 1 increases. As described above, in the disc brake 1, the piston 18 is moved by the linear motion of the pushrod 102 upon the application, and then the piston 18 is moved by the ball-and-ramp mechanism 127.

Then, when the parking brake is to be released, based on the parking release operation on the parking switch 176, the ECU 175 drives and rotates the motor 40 in the release direction for returning the piston 18, in other words, separating the piston 18 from the disc rotor D. As a result, the spur gear multi-stage speed reduction mechanism 44 and the planetary gear speed reduction mechanism 45 carry out the rotational drive in the release direction for returning the piston 18, and the rotational drive is transmitted to the base nut 75 through intermediation of the carrier 62.

On this occasion, the reaction force against the pressing force from the disc rotor D acts on the pushrod 102. Therefore, the rotation resistance torque of the second thread fitting part 106 between the second male thread 104 of the pushrod 102 and the female thread 162 of the rotary-to-linear ramp 151 of the ball-and-ramp mechanism 127, the rotation resistance torque of the first thread fitting part 105 between the first male thread 103 of the pushrod 102 and the female thread 97 of the base nut 75, and the rotation resistance torque against the release direction of the pushrod 102 with respect to the base nut 75, which is caused by the first spring clutch 100, are applied. Therefore, as illustrated in FIG. 10, the rotational torque in the release direction from the base nut 75 is transmitted to the pushrod 102 (including the rotation member 125), and is also transmitted to the rotary-to-linear ramp 151 of the ball-and-ramp mechanism 127. As a result, the rotary-to-linear ramp 151 only rotates in the release direction so as to return to the initial position in the rotational direction. On this occasion, the rotary-tolinear ramp 151 does not move in the axial direction, and the position in the axial direction does not change.

On this occasion, as the rotary-to-linear ramp 151 returns to the initial position in the rotational direction, the coil spring 121 biases the fixed ramp 154 together with the other-end-side washer 122, the support plate 123, the rotation member 125, and the thrust bearing 126. Therefore, while the respective balls 152 are rolling between the respective ball grooves 157 and 163, the support plate 123, the rotation member 125, the thrust bearing 126, and the fixed ramp 154 move forward with respect to the retainer 10. As a result, the pushrod 102 and the rotation member 125 move in the axial direction by means of the spline. It should be noted that if the rotation member 125 is fixed to the pushrod 102 by means of press-fitting or the like, the fixed ramp 154 does not move in the axial direction, the balls 152 axially depart from the ball grooves 157 and 163, but do not fall off therefrom, and a subsequent operation is the same. Moreover, such a configuration that the rotation resistance torque of the second thread fitting part 106 is smaller than the rotation resistance torque of the thrust bearing 128 may be provided, and, in this case, the rotary-to-linear ramp 151 axially returns simultaneously with the start of the rotation.

Then, when the rotary-to-linear ramp 151 returns to the initial position in the rotational direction, the respective balls 152 are sandwiched between the respective ball grooves 163 of the rotary-to-linear ramp 151 and the respective ball grooves 157 of the fixed plate 154. Thus, the rotary-to-linear ramp 151 cannot rotate any more with respect to the fixed plate 154, and the rotary-to-linear ramp 151 stops rotating. As a result, as illustrated in FIG. 11, first, only the second thread fitting part 106 relatively rotates, and thus the rotary-to-linear ramp 151 of the ball-and-ramp mechanism 127 moves axially together with the retainer 110 toward the bottom wall 11 side (in the release direction) of the cylinder 15, and returns to the initial position in the axial direction.

Further, when the motor 40 is driven to rotate in the release direction, and the rotation of the base nut 75 in the release direction continues, the rotary-to-linear ramp 151 of the ball-and-ramp mechanism 127 returns to the initial position both in the rotational direction and the axial direction. At the same time, the threadedly engaged position of the second thread fitting part 106 between the second male thread 104 of the pushrod 102 and the female thread 162 of the rotary-to-linear ramp 151 of the ball-and-ramp mechanism 127 returns to the initial position, and thus the rotation of the pushrod 102 in the release direction stops. When the rotation of the base nut 75 in the release direction further continues, as illustrated in FIG. 12, the pushrod 102 moves backward along the axial direction toward the bottom wall 11 side (in the release direction) of the cylinder 15 against the rotation resistance torque against the release direction of the pushrod 102 with respect to the base nut 75, which is caused by the first spring clutch 100. As a result, along with the pushrod 102, the retainer 110 and the respective components in the retainer 110 such as the one-end-side washer 120, the coil spring 121, the other-end-side washer 122, the support plate 123, the second spring clutch 124, the rotation member 125, the thrust bearing 126, the ball-and-ramp mechanism 127, the thrust bearing 128, and the annular pressure plate 129 integrally move backward along the axial direction toward the bottom wall 11 side (in the release direction) of the cylinder 15. Then, the ECU 175 provides such control as to stop the motor 40 when a gap between the annular pressure plate 129 of the rotary-to-linear ramp 151 and the annular curved surface part 31 of the bottom part 19 of the piston 18 reaches an initial position including a predetermined gap. Finally, the piston 18 moves backward to the original position by a restoring force generated through the elastic deformation of the piston seal 16, and the braking force is completely released. As described above, in this disc brake 1, upon the release, the ball-and-ramp mechanism 127 is returned to the initial position, then the ball-and-ramp mechanism 127 is moved backward, and then the pushrod 102 is moved backward so as to release the holding force for the piston 19.

As described above, in the disc brake 1 according to this embodiment, when the piston 18 is thrust so as to be held in the braking position as for the parking brake, and the pressing forces are applied from the pair of the inner and outer brake pads 2 and 3 to the disc rotor D, the first thread fitting part 105 between the first male thread 103 of the pushrod 102 and the female thread of the base nut 75 and the second thread fitting part 106 between the second male thread 104 of the pushrod 102 and the female thread 162 of the rotary-to-linear ramp 151 of the ball-and-ramp mechanism 127, which are low in a mechanical efficiency, and the ball-and-ramp mechanism 127, which is high in the mechanical efficiency, can be combined to hold the pressing forces to the disc rotor D while securing an appropriate operation efficiency of the rotary-to-linear conversion mechanism 43. As a result, compared with a ratchet mechanism employed in the related-art disc brake, the construction thereof can be simplified, thereby increasing a manufacturing efficiency of this disc brake 1.

Moreover, in the disc brake 1 according to this embodiment, not only the pressing force from the first thread fitting part 105 and the second thread fitting part 106 but also the pressing force from the ball-and-ramp mechanism 127 acts on the piston 18, and hence even if the size of the motor 40 is reduced, a desired braking force can be acquired. Further, the rotational torques applied to the spur gear multi-stage speed reduction mechanism 44 and the planetary gear speed reduction mechanism 45 can be suppressed to be small by reducing the size (torque) of the motor 40. Therefore, operation noises can be reduced, and a service life can be increased.

Moreover, in the disc brake 1 according to this embodiment, responsiveness until a gap is secured when the parking brake is applied can be improved by setting the lead of the first thread fitting part 105 to be more than the lead L generated when the ball-and-ramp mechanism 127 and the second thread fitting part 106 operate.

In the disc brake 1 according to this embodiment, upon the release, the ball-and-ramp mechanism 127 is returned to the initial position, then the ball-and-ramp mechanism 127 is moved backward, and then the pushrod 102 is moved backward so as to release the holding force for the piston 19. Thus, even when the release operation is switched to the application operation by an application request during the release, the application operation can be immediately started.

It should be noted that, in the disc brake 1 according to this embodiment, the spur gear multi-stage speed reduction mechanism 44 and the planetary gear speed reduction mechanism 45 are employed as the speed reduction mechanisms, but publicly known speed reduction mechanisms such as the cycloid speed reduction machine and the strain wave gearing may be employed. Moreover, the balls 152 are employed as rolling elements for the ball-and-ramp mechanism 127, but a roller-and-ramp mechanism employing cylindrical members excellent in a load withstanding property may be employed.

Moreover, according to this embodiment, description is given of the operation of the rotary-to-linear conversion mechanism 43 while the parking brake, which is an example of an action of maintaining the stop state of the vehicle, is exemplified, but, for cases other than the case of the parking brake such as the hill-start assist and the hill-down assist for assisting the start of the vehicle on a slope and the auto stop when the accelerator is turned off and the vehicle is stopped, the rotary-to-linear conversion mechanism 43, which is the parking brake mechanism, may be operated.

Description is now given of a second embodiment of the present invention.

Some of related-art disc brakes include a piston holding mechanism as the parking disc brake mechanism for operating when the parking brake is applied, for example (refer to Japanese Patent Application Laid-open No. 2014-92165). However, according to Japanese Patent Application Laid-open No. 2014-92165, a coil part of a one-way clutch for applying a rotation resistance torque against a rotation in one direction of an adjuster nut is wound in an annular groove part formed on an outer peripheral surface of the adjuster nut, and a space for forming the annular groove part on the outer peripheral surface of the adjuster nut thus needs to be secured, which is not preferred in terms of the size reduction of the structure.

Thus, the second embodiment provides a disc brake compact in the structure.

In other words, the disc brake according to this embodiment includes a pair of pads arranged on both sides of a rotor in an axial direction of the rotor, a piston for pressing one of the pair of pads against the rotor, a caliper main body including a cylinder for movably receiving the piston, a motor installed on the caliper main body, and a rotary-to-linear conversion mechanism installed on the caliper main body, which is configured to thrust the piston so as to hold the piston in a braking position. The rotary-to-linear conversion mechanism includes a rotation transmission member to which a rotation of the motor is transmitted, a shaft member threadedly fitted to the rotation transmission member so that linear motion of the shaft member is enabled by the rotation of the rotation transmission member, and a one-way clutch for applying a rotation resistance torque against a rotation of the shaft member in one direction. The one-way clutch includes a coil part, and the coil part is wound on a thread groove of a male thread formed on a thread fitting part of the shaft member with respect to the rotation transmission member.

Referring to FIG. 13 to FIG. 19, detailed description is now given of the second embodiment. It should be noted that, in FIG. 13 to FIG. 19, the same components as those of the first embodiment are denoted by reference symbols acquired by adding 200 to the reference symbols used in the first embodiment.

Figure 13:
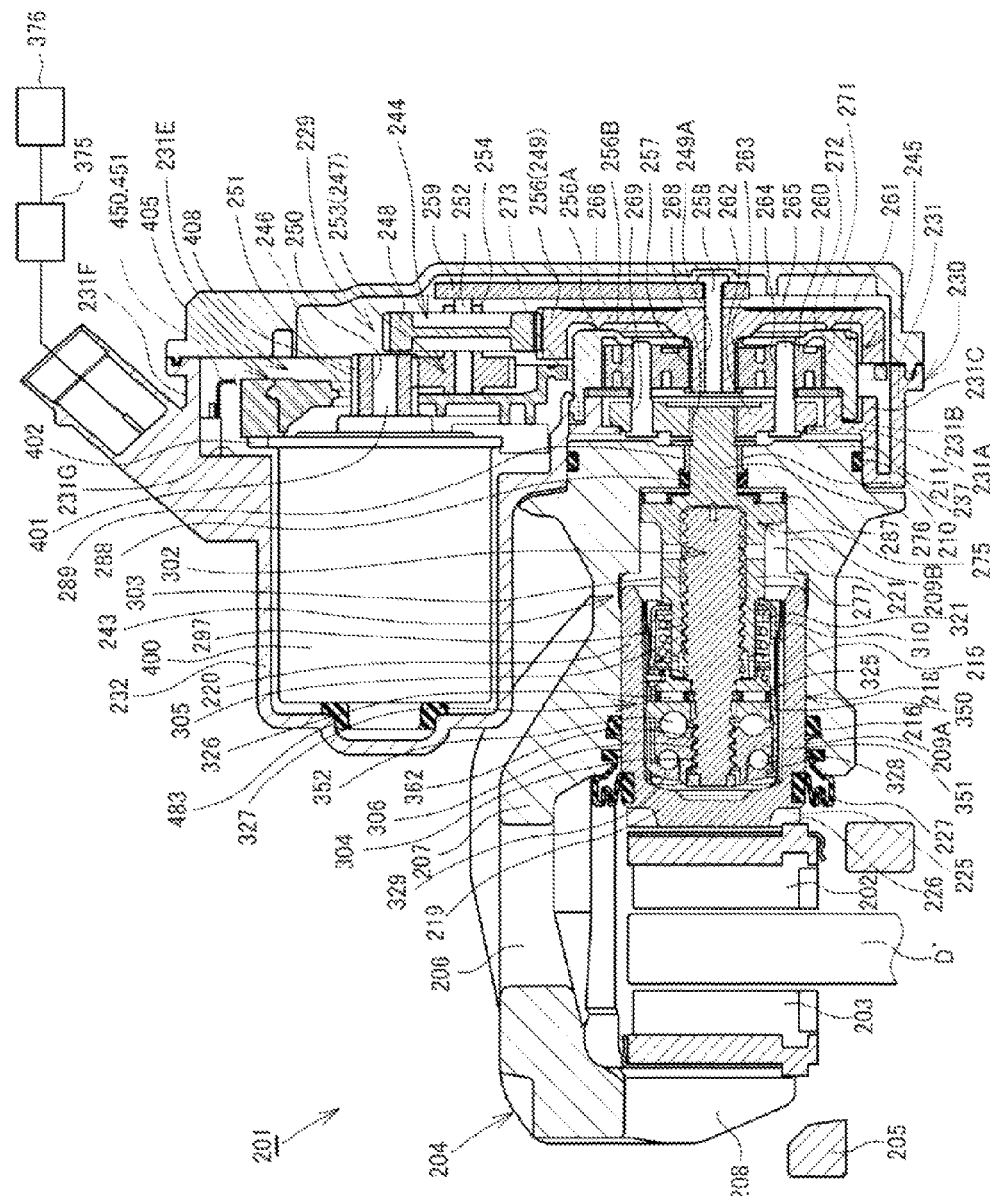
FIG. 13 is a cross sectional view for illustrating a disc brake according to a second embodiment.

As illustrated in FIG. 13, a disc brake 201 according to this embodiment includes a pair of an inner brake pad 202 and an outer brake pad 203 arranged on both sides in an axial direction across a disc rotor D' mounted on a rotary unit of the vehicle, and also includes a caliper 204. This disc brake 201 is a floating caliper disc brake. It should be noted that the pair of the inner brake pad 202 and the outer brake pad 203, and the caliper 204 are supported by a bracket 205 fixed to a stationary unit such as a knuckle of the vehicle, so as to be movable in the axial direction of the disc rotor D'. It should be noted that, in the following, for the sake of description, description is appropriately given while assuming that the right side of FIG. 13 is one end side, and a left side of FIG. 13 is the other end side.

Figure 16:
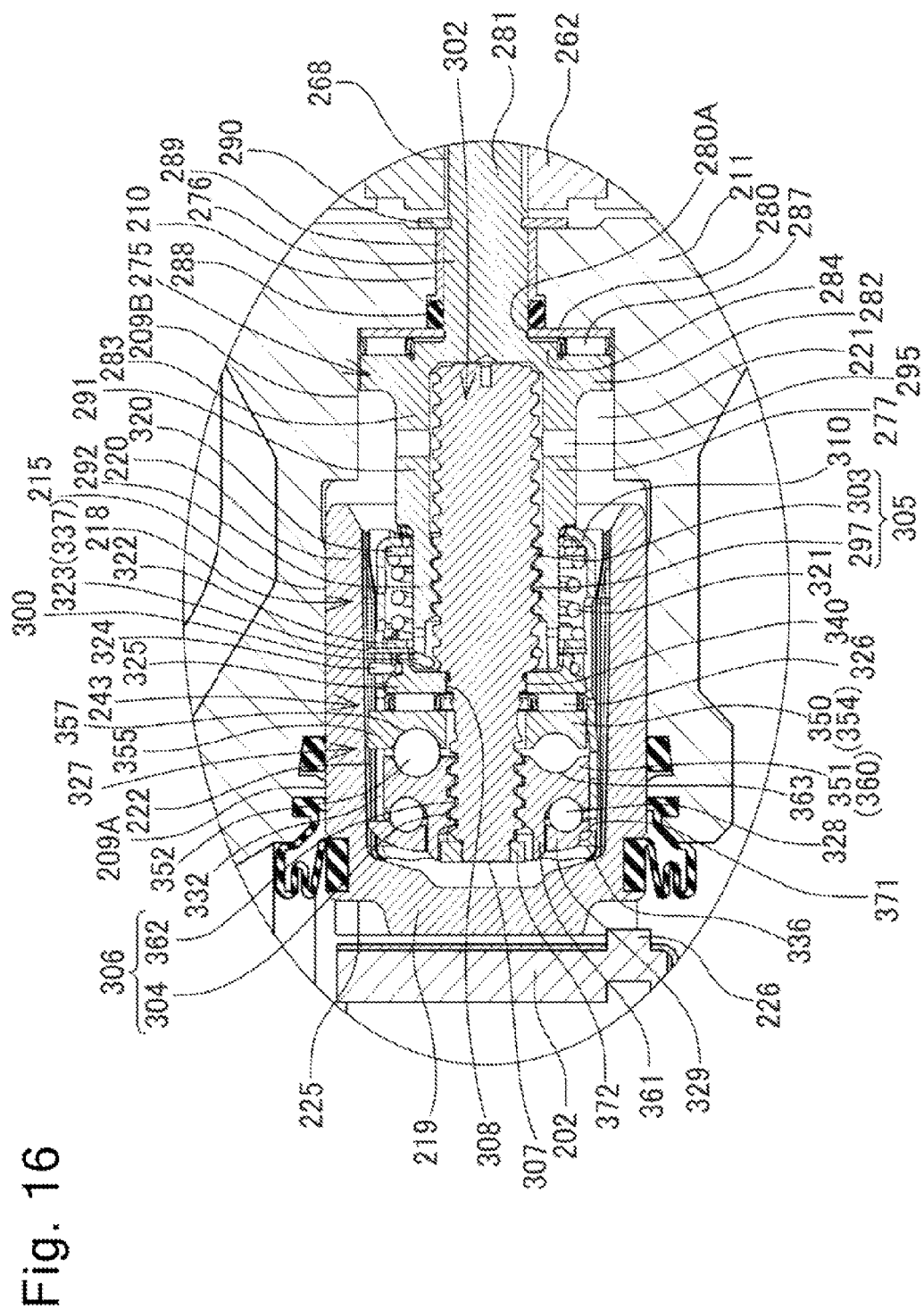
FIG. 16 is an enlarged cross sectional view of the rotary-to-linear conversion mechanism of the disc brake illustrated in FIG. 13.

As illustrated in FIG. 13 and FIG. 16, a caliper main body 206, which is a main body of the caliper 204, includes a cylinder section 207 arranged on a proximal end side opposed to the inner brake pad 202 on the vehicle inboard side, and a claw section 208 arranged on a distal end side opposed to the outer brake pad 203 on the vehicle outboard side. The cylinder section 207 includes a cylinder 215 including a larger diameter opening part 209A opening on the inner brake pad 202 side and a bottom closed by a bottom wall 211 including a hole part 210 on an opposite side thereof. On the bottom wall 211 side of the cylinder 215, a smaller diameter opening part 209B continuously formed with the larger diameter opening part 209A, and smaller in the diameter than the larger diameter opening part 209A is formed. A piston seal 216 is arranged on an inner peripheral surface of the larger diameter opening part 209A of the cylinder 215.

A piston 218 is formed into a bottomed cup shape including a bottom part 219 and a cylindrical part 220. The piston 218 is received in the cylinder 215 so that the bottom part 219 is opposed to the inner brake pad 202. The piston 218 is internally installed in the larger diameter opening part 209A of the cylinder 215 so as to be movable in the axial direction in the state in which the piston 218 is in contact with the piston seal 216. A hydraulic chamber 221 is defined by being sealed by the piston seal 216 between the piston 218 and the bottom wall 211 of the cylinder 215. To this hydraulic chamber 221, a hydraulic pressure is supplied through a port (not shown) formed in the cylinder section 207 from a hydraulic pressure source (not shown) such as a master cylinder or a hydraulic control unit.

A plurality of rotation restriction lengthwise grooves 222 (refer to FIG. 16) are formed along the circumferential direction on the inner peripheral surface of the piston 218. A recess 225 is formed on the bottom part 219 of the piston 218 on the outer peripheral side on the other end surface opposed to the inner brake pad 202. A protrusion 226 formed on the rear surface of the inner brake pad 202 engages with this recess 225. This engagement prevents the piston 218 from rotating relative to the cylinder 215, consequently the caliper main body 206. Moreover, a dust boot 227 for preventing foreign substances from entering the cylinder 215 is interposed between the outer peripheral surface on the bottom part 219 side of the piston 218 and the inner peripheral surface of the larger diameter opening part 209A of the cylinder 215.

Figure 14:
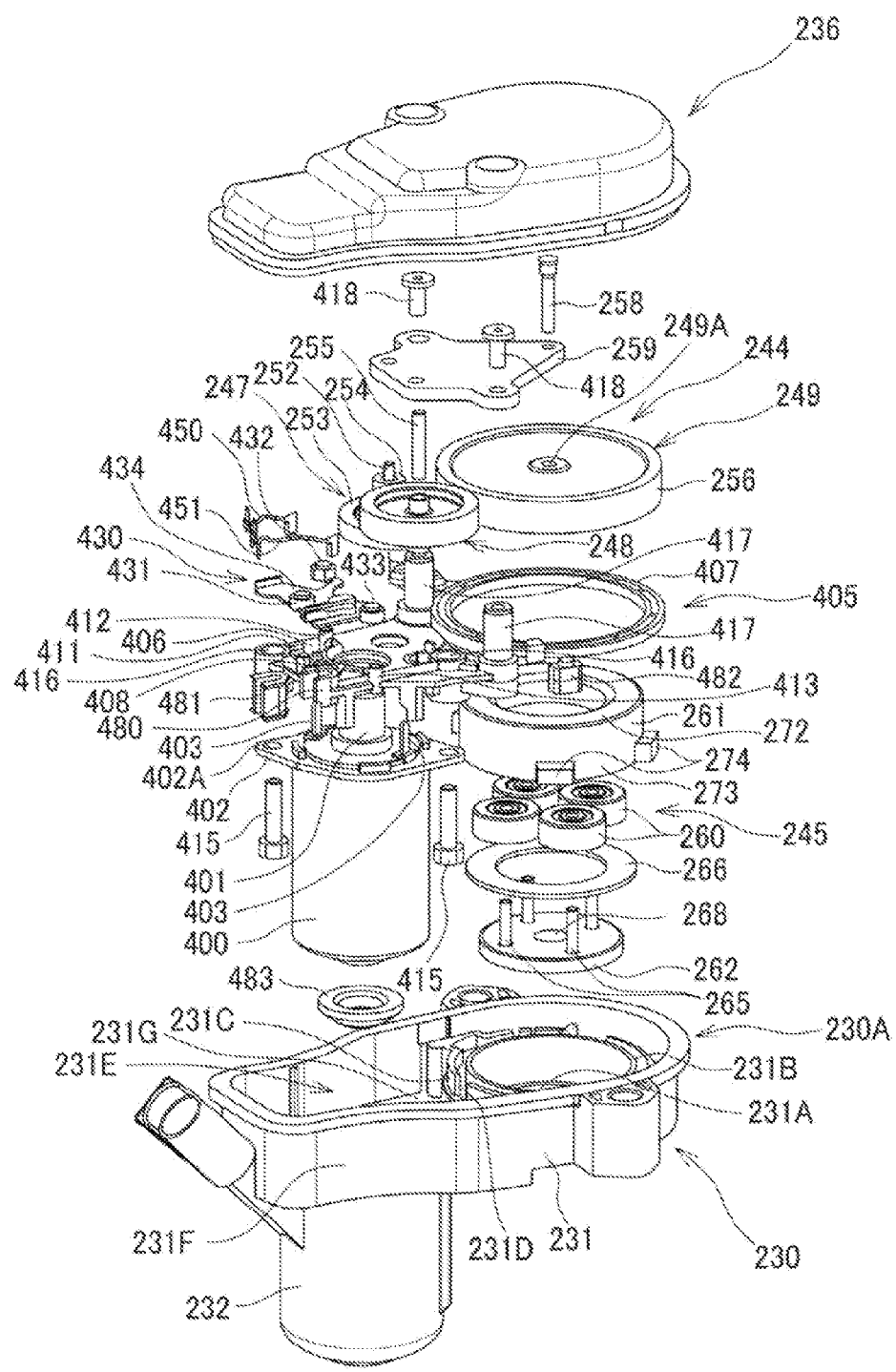
FIG. 14 is an exploded perspective view in a housing of the disc brake illustrated in FIG. 13.
Figure 15:
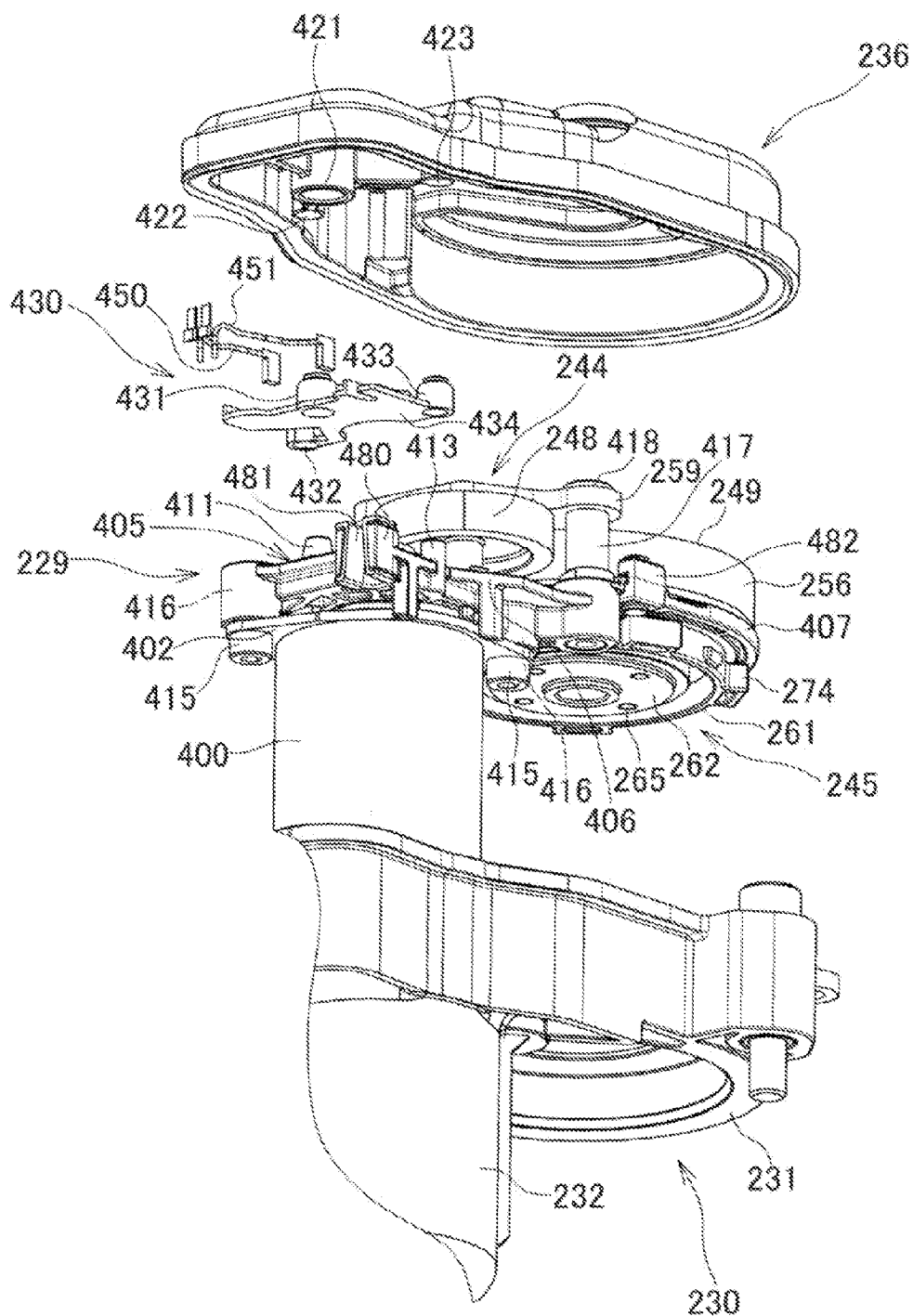
FIG. 15 is an exploded perspective view in the housing of the disc brake illustrated in FIG. 13.

As illustrated in FIG. 13 to FIG. 15, on the bottom wall 211 side of the cylinder 215 of the caliper main body 206, a housing 230 for housing therein a motor/gear assembly 229 is mounted. An opening part 230A is formed on one end of the housing 230. A cover 236 for closing in an airtight manner is mounted to the opening part 230A. In other words, the opening part 230A of the housing 230 is closed by the cover 236. A seal member 237 is arranged between the housing 230 and the cylinder section 207. The airtightness is maintained by this seal member 237 inside the housing 230. The housing 230 includes a first housing part 231 for housing a spur gear multi-stage speed reduction mechanism 244 and a planetary gear speed reduction mechanism 245 described later so as to cover an outer periphery of the bottom wall 211 of the cylinder 215, and a second housing part 232 projecting integrally from the first housing part 231 in a bottomed cylindrical shape, for housing a motor 400. In this way, the housing 230 is configured to use the second housing part 232 in the bottomed cylindrical shape so as to house the motor 400 arranged in parallel with the caliper main body 206. The first housing part 231 includes an outer wall part 231F and a bottom surface part 231G for surrounding, together with the cover 236, a receiving chamber 231E for receiving the spur gear multi-stage speed reduction mechanism 244 and the planetary gear speed reduction mechanism 245 described later, a mounting opening part 231A, which receives a part of the bottom wall 211 of the cylinder 215 and through which a polygonal shaft part 281 of a base nut 275 of a rotary-to-linear conversion mechanism 243 described later is inserted, an inner annular wall part 231B projecting around the mounting opening part 231A, an outer annular wall part 231C projecting on a radially outside at an interval from the inner annular wall part 231B, and a plurality of engagement grooves 231D formed at intervals in the circumferential direction of the outer annular wall part 231C.

As illustrated in FIG. 13, the caliper main body 206 includes the spur gear multi-stage speed reduction mechanism 244 and the planetary gear speed reduction mechanism 245 for increasing the driving force by the motor 400, and the rotary-to-linear conversion mechanism 243 for thrusting the piston 218 and holding the piston 218 in the braking position. The spur gear multi-stage speed reduction mechanism 244 and the planetary gear speed reduction mechanism 245 are received in the receiving chamber 231E in the first housing part 231 of the housing 230.

As illustrated in FIG. 13 to FIG. 15, the spur gear multi-stage speed reduction mechanism 244 includes a pinion gear 246, a first speed reduction gear 247, a non-speed reduction spur gear 248, and a second speed reduction gear 249. The first speed reduction gear 247, the non-speed reduction spur gear 248, and the second speed reduction gear 249 are made of a metal or a resin such as a fiber reinforced resin.

The pinion gear 246 is formed into a cylindrical shape, and includes a hole part 250 press-fitted and fixed to a rotation shaft 401 of the motor 400, and a gear 251 formed on an outer periphery of the hole part 250. The first speed reduction gear 247 integrally includes a larger gear 253, which is larger in diameter and meshes with the gear 251 of the pinion gear 246, and a smaller gear 254, which is smaller in diameter and formed to extend in the axial direction from the larger gear 253. The first speed reduction gear 247 is supported by a shaft 252 so as to be rotatable with respect to a support plate 259 and a holder 405 described later. The shaft 252 is supported at one end by the support plate 259 close to the cover 36, and is supported at the other end by the holder 405.

The smaller gear 254 of the first speed reduction gear 247 meshes with the non-speed reduction gear 248. The non-speed reduction spur gear 248 is supported by a shaft 255 (refer to FIG. 14) so as to be rotatable with respect to the support plate 259 and the holder 405. The shaft 255 is supported at one end by the support plate 259 close to the cover 236, and is supported at the other end by the holder 405. The second speed reduction gear 249 integrally includes a larger gear 256, which is larger in diameter and meshes with the non-speed reduction spur gear 248, and a sun gear 257, which is smaller in diameter and formed to extend in the axial direction from the larger gear 256. The sun gear 257 is constructed as a part of the planetary gear speed reduction mechanism 245 described later. A hole 249A is formed at the center of the second speed reduction gear 249, and a shaft 258 is inserted through the hole 249A. One end of the shaft 258 is press-fitted and fixed to the support plate 259 arranged close to the cover 236. The second speed reduction gear 249 is rotatably supported by the shaft 258. Moreover, an annular stopper part 256A protruding toward the planetary gear speed reduction mechanism 245 side is formed on an annular wall part of the larger gear 256 of the second speed reduction gear 249.

The planetary gear speed reduction mechanism 245 includes the sun gear 257 of the second speed reduction gear 249, a plurality of (four according to this embodiment) planet gears 260, an internal gear 261, and a carrier 262. Each of the planet gears 260 includes a gear 263, which meshes with the sun gear 257 of the second speed reduction gear 249, and a hole part 264 for rotatably inserting therethrough a pin 265, which is provided upright from the carrier 262. The respective planet gears 260 are arranged equiangularly on a circumference of the carrier 262. On the other end side of the respective planet gears 260, an annular plate 266 is arranged.

The carrier 262 is formed into a disc shape, and a polygonal hole 268 is formed approximately at the radial center thereof. An outer diameter of the carrier 262 is approximately the same as an outer diameter of a revolution trajectory of the respective planet gears 260. On an outer peripheral side of the carrier 262, a plurality of pin hole parts 269 arranged in the circumferential direction at intervals are formed. The pin 265 is press-fitted and fixed to each pin hole part 269. The pin 265 is rotatably inserted through the hole part 264 of each planet gear 260. Then, the polygonal hole 268 of the carrier 262 and the polygonal shaft part 281 of the base nut 275 of the rotary-to-linear conversion mechanism 243 described later are fitted to each other to enable transmission of the rotational torque between the carrier 262 and the base nut 275.

The internal gear 261 includes internal teeth 271, which mesh with the gears 263 of the respective planet gears 260, an annular wall part 272 continuously extending from one end on the cover 236 side of the internal teeth 271 in the radial direction to restrict the axial movement of the respective planet gears 260, and a cylindrical wall part 273 extending from the internal teeth 271 toward the bottom wall 211 of the cylinder 215. The internal gear 261 is fixed to the housing 230 by inserting the cylindrical wall part 273 through an annular space between the inner annular wall part 231B and the outer annular wall part 231C of the first housing part 231. The annular plate 266 is arranged in the internal gear 261. The annular plate 266 is sandwiched between the end surfaces of the internal teeth 271 of the internal gear 261 and the inner annular wall part 231B of the first housing part 231. As a result, the respective planet gears 260 are arranged between the annular wall part 272 of the internal gear 261 and the annular plate 266, and the axial movement thereof is restricted.

Moreover, a plurality of projections 274 arranged at intervals in the circumferential direction are projected on the other end side of the outer peripheral surface of the internal gear 261. Each of the projections 274 projects outward, and is engaged with each engagement groove 231D formed on the first housing part 231. The internal gear 261 is supported unrotatable in the first housing part 231 by inserting and engaging the respective projections 274 into and with the respective engagement grooves 231D of the first housing part 231. Further, the annular stopper part 256A formed on the larger gear 256 of the second speed reduction gear 249 is arranged on the cover 236 side of the annular wall part 272 of the internal gear 261, and hence the internal gear 261 is supported in the first housing part 231 so as to be immovable also in the axial direction.

The motor 400 is supported by the holder 405 arranged on a flange part 402 thereof. The holder 405 is constructed by integrally connecting a motor support part 406 and a ring-shape support part 407. The motor support part 406 is arranged between the flange part 402 of the motor 400 and each of the first speed reduction gear 247 and the non-speed reduction spur gear 248, and is configured to support the motor 400. The ring-shape support part 407 is arranged around the internal gear 261 of the planetary gear speed reduction mechanism 245 so as to surround the internal gear 261. A rotation shaft insertion hole 408 through which the pinion gear 246 press-fitted and fixed to the rotation shaft 401 of the motor 400 is inserted is formed in the motor support part 406. Terminal through holes into which respective motor terminals 403 of the motor 400 are inserted are formed at two locations around the rotation shaft insertion hole 408. A pair of the terminal insertion holes are formed on both sides in the radial direction of the rotation shaft insertion hole 408. Harnesses 450 and 451 are respectively connected to the motor terminals 403 of the motor 400.

On the motor support part 406 of the holder 405, a holder-side first protrusion 411, a holder-side second protrusion 412, and a holder-side third protrusion 413 are respectively formed at intervals around the rotation shaft insertion hole 408 on a side opposite to the planetary gear speed reduction mechanism 245 side. These holder-side first protrusion 411, holder-side second protrusion 412, and holder-side third protrusion 413 are in a columnar shape, and project toward the cover 236 side. Fastening holes 416 are formed at two locations on the motor support part 406. Respective fixing bolts 415 are fastened through respective through holes 402A of the flange part 402 of the motor 400 to the fastening holes 416 of the motor support part 406. As a result of this fastening, the motor 400 is supported by the motor support part 406 of the holder 405. The ring-shape support part 407 is arranged above the respective projections 274 so as to abut against the outer peripheral surface of the internal gear 261 of the planetary gear speed reduction mechanism 245.

Cylindrical support parts 417 are formed at two locations at an interval integrally on the holder 405 between the motor support part 406 and the ring-shape support part 407. The support plate 259 is arranged on the respective cylindrical support parts 417, and each fixing bolt 418 is fastened to each cylindrical support part 417 of the holder 405 through intermediation of the support plate 259. As a result, the support plate 259 is supported above the holder 405 at an interval.

Moreover, as illustrated in FIG. 13 to FIG. 15, on an inner surface of the cover 236, a cover-side first cylindrical part 421, a cover-side second protrusion 422, and a cover-side third protrusion 423 respectively project at intervals. These cover-side first cylindrical part 421, cover-side second protrusion 422, and cover-side third protrusion 423 are respectively formed at locations opposed to the holder-side first protrusion 411, the holder-side second protrusion 412, and the holder-side third protrusion 413 formed on the holder 405. Then, between the cover-side first cylindrical part 421, the cover-side second protrusion 422, and the cover-side third protrusion 423 on the cover 236 and the holder-side first protrusion 411, the holder-side second protrusion 412, and the holder-side third protrusion 413 on the holder 405, a rubber member 430, which is an elastic member, is interposed.

The rubber member 430 includes a first cup part 431, a second cup part 432, a third cup part 433, and a base part 434 in a plate shape integrally connecting opening-side ends of the first cup part 431, the second cup part 432, and the third cup part 433 with one another.

Then, the first cup part 431 of the rubber member 430 is fitted to the holder-side first protrusion 411 of the holder 405, the second cup part 432 of the rubber member 430 is fitted to the holder-side second protrusion 412 of the holder 405, and the third cup part 433 of the rubber member 430 is fitted to the holder-side third protrusion 413 of the holder 405 so as to unify the rubber member 430 with the holder 405. Then, the cover 236 is put over so that the cover-side first cylindrical part 421 of the cover 236 is fitted to the first cup part 431 of the rubber member 430, the cover-side second protrusion 422 of the cover 236 abuts against the second cup part 432 of the rubber member 430, and the cover-side third protrusion 423 of the cover 236 abuts against the third cup part 433 of the rubber member 430. The harnesses 450 and 451 extending from the respective motor terminals 403 of the motor 400 are arranged along a top of the base part 434 of the rubber member 430.

Moreover, as illustrated in FIG. 14, according to this embodiment, a plurality of types of rubber members 481, 482, and 483 are provided independently of the above-mentioned rubber member 430 in the housing 230. A support part 480 in a horizontal U shape in the cross section is formed at an end on the motor support part 406 side of the holder 405, and, inside the support part 480, the rubber member 481 in a horizontal U shape in the cross section is integrally arranged. The rubber members 482 in a block shape are respectively arranged between the outer peripheral surface of the ring-shape support part 407 of the holder 405 at locations close to the respective cylindrical support parts 417 and the inner wall surface of the first housing part 231. The cylindrical rubber member 483 is arranged between the main body-side end of the motor 400 and the bottom wall part of the second housing part 232.

In this way, the motor/gear assembly 229 is constructed by assembling the motor 400, the spur gear multi-stage speed reduction mechanism 244, the planetary gear speed reduction mechanism 245, and the rubber members 430, 481, 482, and 483 to the holder 405 and the support plate 259. The motor/gear assembly 229 is mounted to the housing 230 and the cover 236 in a suspended state, namely in a floating state, through intermediation of the rubber members 430, 481, 482, and 483. In other words, the motor/gear assembly 229 is fixed to the housing 230 and the cover 236 through intermediation of the rubber members 430, 481, 482, and 483 without abutment of the holder 405 against the housing 230 and the cover 236. As described above, by fixing the motor/gear assembly 229 to the housing 230 and the cover 236 through intermediation of the rubber members 430, 481, 482, and 483, transmission of vibrations generated on the motor 400, the spur gear multi-stage speed reduction mechanism 244, and the planetary gear speed reduction mechanism 245 to the housing 230 or the cover 236 is suppressed, and generation of noises caused by the vibrations can thus be suppressed.

It should be noted that, according to this embodiment, in order to acquire the rotational force for thrusting the piston 225, as the speed reduction mechanism for increasing the driving force of the motor 400, the spur gear multi-stage speed reduction mechanism 224 and the planetary gear speed reduction mechanism 245 are employed, but the speed reduction mechanism may be constructed only by the planetary gear speed reduction mechanism 245. Moreover, other speed reduction machines of publicly known art such as the cycloid speed reduction mechanism and the strain wave gearing may be combined with the planetary gear speed reduction mechanism 245.

Referring to FIG. 13 and FIG. 16 to FIG. 19, specific description is now given of the rotary-to-linear conversion mechanism 243. It should be noted that, in the following, for the sake of description, description is appropriately given while assuming that the right side of FIG. 13 and FIG. 16 is one end side, and a left side of FIG. 13 and FIG. 16 is the other end side.

The rotary-to-linear conversion mechanism 243 is configured to convert the rotational motion from the spur gear multi-stage speed reduction mechanism 244 and the planetary gear speed reduction mechanism 245, namely the rotation of the motor 400, into a motion in a straight line direction (hereinafter referred to as linear motion for the sake of convenience), apply a thrust to the piston 218, and hold the piston 218 at the braking position. The rotary-to-linear conversion mechanism 243 includes the base nut 275 serving as the rotation transmission member, to which the rotational motion from the spur gear multi-stage speed reduction mechanism 244 and the planetary gear speed reduction mechanism 245 is transmitted and which is rotatably supported, a pushrod 302, which is the shaft member threadedly fitted to a female thread 297 of the base nut 275 and supported so that rotation and linear motion are enabled by the rotation of the base nut 275, and a ball-and-ramp mechanism 327, which is threadedly fitted to the pushrod 302 and applies a thrust in the axial direction to the piston 218 by the rotation of the pushrod 302. The rotary-to-linear conversion mechanism 243 is received between the cylinder 215 of the caliper main body 206 and the piston 218.

As illustrated in FIG. 4 and FIG. 5, the base nut 275 includes a columnar part 276 and a nut part 277 integrally formed on the other end of the columnar part 276. A washer 280 is arranged so as to abut against the bottom wall 211 of the cylinder 215. The columnar part 276 of the base nut 275 is inserted through an insertion hole 280A of the washer 280 and the hole part 210 formed through the bottom wall 211 of the cylinder 215. The polygonal shaft part 281 is integrally connected to a distal end side of this columnar part 276. The polygonal shaft part 281 is inserted through the mounting opening part 231A of the first housing part 231, and is fitted to the polygonal hole 268 of the carrier 262. The nut part 277 of the base nut 275 is formed into a bottomed cylindrical shape. The nut part 277 includes a circular wall part 282 and a cylindrical part 283 integrally projecting from the other end surface of the circular wall part 232. The outer peripheral surface of the circular wall part 282 is close to the inner wall surface of the smaller diameter opening part 209B of the cylinder 215. A smaller diameter circular wall part 284 projects from a radial center part of one end surface of the circular wall part 282. The columnar part 276 projects from one end surface of the smaller diameter circular wall part 284 toward the one end side. An outer diameter of the columnar part 276 is formed so as to be smaller than an outer diameter of the cylindrical part 283 of the nut part 277.

A thrust bearing 287 is arranged between the circular wall part 282, which is formed around the smaller diameter circular wall part 284 on the nut part 277 of the base nut 275, and the washer 280. Then, the base nut 275 is rotatably supported by the thrust bearing 287 on the bottom wall 211 of the cylinder 215. A seal member 288 and a sleeve 289 are respectively arranged between the outer peripheral surface of the columnar part 276 of the base nut 275 and the hole part 210 of the bottom wall 211 of the cylinder 215. As a result, the liquid tightness of the hydraulic chamber 221 is maintained. A snap ring 290 is installed in an annular groove formed between the columnar part 276 of the base nut 275 and the polygonal shaft part 281. The axial movement of the base nut 275 is restricted by the snap ring 290.

The cylindrical part 283 of the nut part 277 of the base nut 275 includes a larger diameter cylindrical part 291 arranged on the one end side and a smaller diameter cylindrical part 292 arranged on the other end side. One end of the larger diameter cylindrical part 291 is integrally connected to the circular wall part 282. A plurality of through holes 295 extending in the radial direction are formed in the peripheral wall part of the larger diameter cylindrical part 291. The plurality of through holes 295 are formed at intervals in the circumferential direction. The female thread 297 is formed on the inner peripheral surface of the smaller diameter cylindrical part 292 of the nut part 277. A plurality of lock grooves 298 are respectively formed at intervals in the circumferential direction on the other end surface of the peripheral wall part of the smaller diameter cylindrical part 292. According to this embodiment, the lock grooves 298 are formed at four locations.

A distal end part 300A of a first spring clutch 300 serving as a one-way clutch for applying a rotational resistance to a rotation in one direction is fitted to any one of the respective lock grooves 298 of the smaller diameter cylindrical part 292 of the base nut 275. The first spring clutch 300 includes the distal end part 300A directed outward in the radial direction, and a coil part 300B wound once continuously from the distal end part 300A. Then, the distal end part 300A of the first spring clutch 300 is fitted to any of the respective lock grooves 298 of the smaller diameter cylindrical part 292 of the base nut 275. Also referring to FIG. 18 and FIG. 19, the coil part 300B of the first spring clutch 300 is wound in a thread groove 303A on the other end side of a male thread 303 of the pushrod 302 detailed later. This first spring clutch 300 is configured to apply a rotation resistance against for a rotational direction (rotational direction upon the release) when the pushrod 302 moves toward the bottom wall 211 side of the cylinder 215 with respect to the base nut 275, and to permit a rotation in a rotational direction (rotational direction upon the application) when the pushrod 302 moves toward the bottom part 219 side of the piston 218 with respect to the base nut 275.

In the nut part 277 of the base nut 275, the one end side of the pushrod 302 is inserted. The male thread 303 to be threadedly fitted to the female thread 297 of the smaller diameter cylindrical part 292 of the base nut 275 is formed on the one end side of the pushrod 302. A first thread fitting part 305 between the male thread 303 of this pushrod 302 and the female thread 297 of the smaller diameter cylindrical part 292 of the base nut 275 is constructed so that the base nut 275 is not rotated by an axial load transmitted from the piston 218 to the pushrod 302, and is thus 0 or less in the backward efficiency, that is, constructed as a thread fitting part large in the irreversibility. Moreover, as appreciated from FIG. 16, on the thread groove 303A (refer to FIG. 18 and FIG. 19) of the male thread 303 on the other end side from the first thread fitting part 305 of the pushrod 302 with respect to the base nut 275, the coil part 300A of the first spring clutch 300 is wound.

On the other hand, on the other end side of the pushrod 302, a male thread 304 to be threadedly fitted to a female thread 362 formed on a rotary-to-linear ramp 351 of the ball-and-ramp mechanism 327 described later is formed. Also in this case, a second thread fitting part 306 between the male thread 304 of the pushrod 302 and the female thread 362 formed on the rotary-to-linear ramp 351 is constructed so that the pushrod 302 is not rotated by an axial load transmitted from the piston 218 to the rotary-to-linear ramp 351, and is thus 0 or less in the backward efficiency, that is, constructed as a thread fitting part large in the irreversibility.

The pushrod 302 includes a spline shaft 308 between the male thread 303 on one end side and the male thread 304 on the other end side. An outer diameter of the male thread 303 on the one end side is formed so as to be larger than an outer diameter of the male thread 304 on the other end side. The outer diameter of the male thread 303 on the one end side is formed so as to be larger than an outer diameter of the spline shaft 308. A smaller diameter columnar part 307 is continuously formed from the male thread 304 of the pushrod 302 on the other end side. An outer peripheral surface of the columnar part 307 is knurled. A stopper member 372 is integrally fixed by means of press-fitting to the columnar part 307 of the pushrod 302. A relative rotation range with respect to the pushrod 302 of the rotary-to-linear ramp 351 is defined by the stopper member 372. The other end surface of the columnar part 307 of the pushrod 302 is opposed to the bottom part 219 of the piston 218.

Between the outer peripheral surface of the smaller diameter cylindrical part 292 constructing the nut part 277 of the base nut 275 and the inner peripheral surface of the cylindrical part 220 of the piston 218, a retainer 310 is supported so as to be axially movable. The retainer 310 includes an annular wall part 311 on the one end side, and is constructed as an approximately cylindrical shape as a whole. A plurality of through holes 314 and 315 are formed in the outer peripheral wall of the retainer 310.

In the retainer 310, in the order from the one end side, a one-end-side washer 320, a coil spring 321, an other-end-side washer 322, a support plate 323, a second spring clutch 324, a rotation member 325, a thrust bearing 326, the ball-and-ramp mechanism 327, a thrust bearing 328, and an annular pressure plate 329 are arranged. The one-end-side washer 320 is arranged so as to abut against the other end surface of the annular wall part 311 of the retainer 310.

Between the one-end-side washer 320 and the other-end-side washer 322, the coil spring 321 is interposed. The coil spring 321 biases the one-end-side washer 320 and the other-end-side washer 322 in the direction to separate the one-end-side washer 320 and the other-end-side washer 322 from each other. A plurality of lock grooves 332 having a predetermined depth are formed at intervals in the circumferential direction on the other end surface of the peripheral wall part of the retainer 310. Each of the lock grooves 332 continuously includes a narrow lock groove 333 located on the one end side and a wide lock groove 334 located on the other end side. According to this embodiment, the lock grooves 332 are formed at three locations. On the other end of the retainer 310, a plurality of pawl parts 336 directed toward the bottom part 219 of the piston 218 are formed. After the one-end-side washer 320, the coil spring 321, the other-end-side washer 322, the support plate 323, the second spring clutch 324, the rotation member 325, the thrust bearing 326, the ball-and-ramp mechanism 327, the thrust bearing 328, and the annular pressure plate 329 are received in the retainer 310, the respective pawl parts 336 of the retainer 310 are bent toward reception recesses 371 of the annular pressure plate 329 described later, to thereby integrally arrange and assemble the large number of above-mentioned components in the retainer 310.

The annular support plate 323 is arranged so as to abut against the other end surface of the other-end-side washer 322. A plurality of projecting pieces 337 are formed at intervals along the circumferential direction on an outer peripheral surface of the support plate 323. According to this embodiment, the projecting pieces 337 are formed at three locations. Each of the projecting pieces 337 of the support plate 323 is fitted to each narrow lock groove 333 of the retainer 310 and each rotation restriction lengthwise groove 222 formed on the inner peripheral surface of the piston 218. As a result, the retainer 310 as well as the one-end-side washer 320, the coil spring 321, the other-end-side washer 322, and the support plate 323 is supported so as to be unrotatable relative to the piston 218, but axially movable relative to the piston 218.

In the retainer 310, the rotation member 325 is rotatably supported on the other end side of the support plate 323. The rotation member 325 includes a larger diameter annular part 341 including a spline hole 340 and a smaller diameter cylindrical part 342 projecting integrally from one end surface of the larger diameter annular part 341. One end of the smaller diameter cylindrical part 342 abuts against the other end surface of the support plate 323. The pushrod 302 is inserted in the rotation member 325 so that the spline hole 340 of the larger diameter annular part 341 of the rotation member 325 is coupled by means of the spline to the spline shaft 308 of the pushrod 302. As a result, the rotation member 325 and the pushrod 302 mutually transmit a rotational torque to each other.

The second spring clutch 324 for applying a rotational resistance to a rotation in one direction is wound on the outer peripheral surface of the smaller diameter cylindrical part 342 of the rotation member 325. The second spring clutch 324 includes, as in the first spring clutch 300, a distal end part 324A directed outward in the radial direction, and a coil part 324B wound once continuously from the distal end part 324A. Then, the distal end part 324A of the second spring clutch 324 is fitted to any one of the narrow lock grooves 333 of the retainer 310, and the coil part 324B is wound on the outer peripheral surface of the smaller diameter cylindrical part 342 of the rotation member 325. The second spring clutch 324 is configured to apply a rotation resistance torque against a rotational direction (rotational direction upon the application) when the rotation member 325 (pushrod 302) moves toward the bottom part 219 side of the piston 218 with respect to the retainer 310, and permit a rotation in a rotational direction (rotational direction upon the release) when the rotation member 325 moves toward the bottom wall 211 side of the cylinder 215.

It should be noted that the rotation resistance torque upon the application of the second spring clutch 324 is set to be larger than the rotation resistance torque of the first thread fitting part 305 between the male thread 303 of the pushrod 302 and the female thread 297 of the base nut 275. The ball-and-ramp mechanism 327 is arranged on the other end side of the rotation member 325 through intermediation of the thrust bearing 326. The rotation member 325 is rotatably supported with respect to the ball-and-ramp mechanism 327 through intermediation of the thrust bearing 326.

The ball-and-ramp mechanism 327 includes a fixed ramp 350, a rotary-to-linear ramp 351, and respective balls 352 interposed between the fixed ramp 350 and the rotary-to-linear ramp 351. The fixed ramp 350 is arranged on the other end side of the rotation member 325 through intermediation of the thrust bearing 326. The fixed ramp 350 includes a fixed plate 354 in a disc shape, and a plurality of protrusions 355 projecting at intervals along the circumferential direction from an outer peripheral surface of the fixed plate 354. In this embodiment, the protrusions 355 are formed at three locations. At a radial center of the fixed plate 354, an insertion hole 356 through which the pushrod 302 is inserted is formed. The respective protrusions 355 of the fixed ramp 350 are fitted to the respective wide lock grooves 334 of the retainer 310, and are fitted to the respective rotation restriction lengthwise grooves 222 formed on the inner peripheral surface of the piston 218, to thereby support the fixed ramp 350 so as to be unrotatable relative to the piston 218, but axially movable relative to the piston 218. On the other end surface of the fixed plate 354, a plurality of (in this embodiment, three) ball grooves 357 each extending in an arc shape at a predetermined inclined angle along the circumferential direction, and having a cross section in an arc shape in the radial direction are formed.

The rotary-to-linear ramp 351 includes an annular rotary-to-linear plate 360, and a cylindrical part 361 integrally projecting from a radial center part of the other end surface of the rotary-to-linear plate 360. The female thread 362 to which the male thread 304 of the pushrod 302 is threadedly fitted is formed on an inner peripheral surface from the rotary-to-linear plate 360 to the cylindrical part 361. On a surface of the rotary-to-linear plate 360 opposed to the fixed plate 354 of the fixed ramp 350, a plurality of ball (in this embodiment, three) grooves 363 each extending in an arc shape at a predetermined inclined angle along the circumferential direction, and having a cross section in the arc shape in the radial direction are formed. It should be noted that each of the ball grooves 357 of the fixed ramp 350 and each of the ball grooves 363 of the rotary-to-linear ramp 351 may be configured so that a dent is formed in the course of the ramp along the circumferential direction, or the ramp may be changed in the course.

Figure 17:
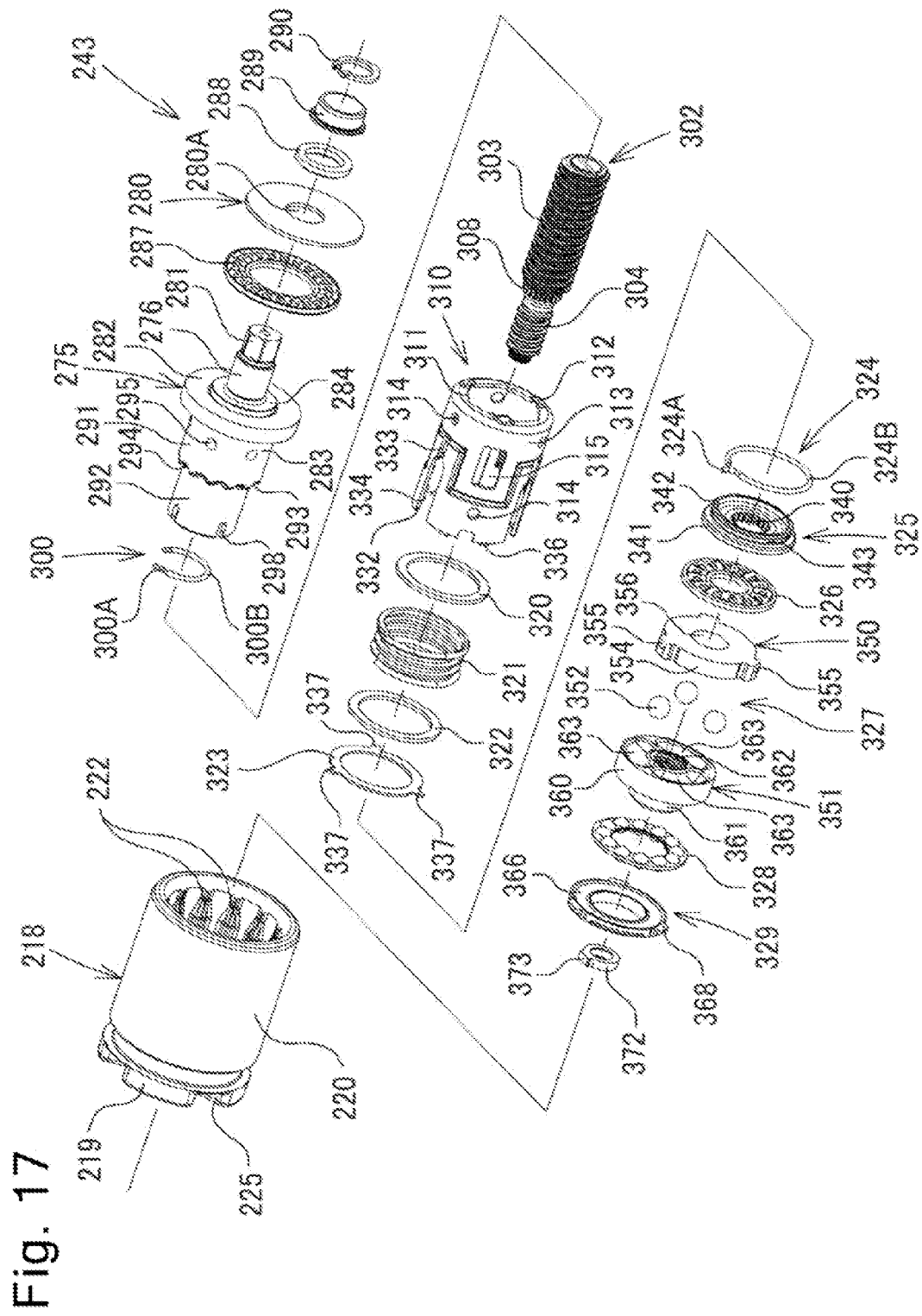
FIG. 17 is an exploded perspective view of the rotary-to-linear conversion mechanism illustrated in FIG. 16.
Figure 18:
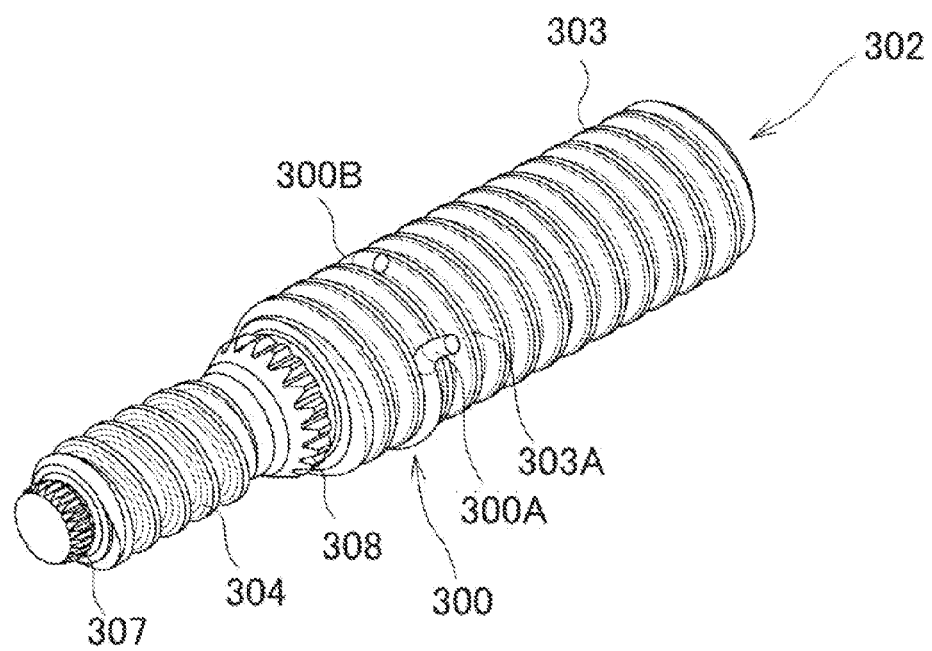
FIG. 18 is a perspective view of the rotary-to-linear conversion mechanism of the disc brake illustrated in FIG. 13.
Figure 19:
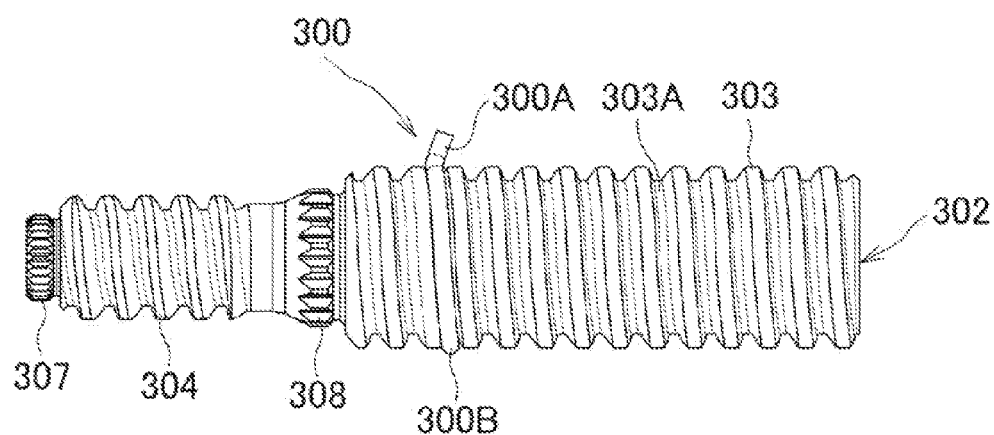
FIG. 19 is a side view of the rotary-to-linear conversion mechanism of the disc brake illustrated in FIG. 18.

As illustrated in FIG. 17, the balls 352 are interposed between the ball grooves 363 of the rotary-to-linear ramp 351 (rotary-to-linear plate 360) and the ball grooves 357 of the fixed ramp 350 (fixed plate 354), respectively. Then, when a rotational torque is applied to the rotary-to-linear ramp 351, the balls 352 roll between the ball grooves 363 of the rotary-to-linear plate 360 and the ball grooves 357 of the fixed plate 354, respectively, and thus a rotational difference is generated between the rotary-to-linear plate 360 and the fixed plate 354, to thereby fluctuate a relative axial distance between the rotary-to-linear plate 360 and the fixed plate 354.

The annular pressure plate 329 is arranged on the other end side around the cylindrical part 361 of the rotary-to-linear plate 360 through intermediation of the thrust bearing 328. On the outer peripheral surface of the annular pressure plate 329, a plurality of protrusions 368 are projected at intervals along the circumferential direction. According to this embodiment, the protrusions 368 are formed at three locations. The respective protrusions 368 are fitted to the respective wide lock grooves 334 of the retainer 310, and are fitted to the respective rotation restriction lengthwise grooves 222 formed on the inner peripheral surface of the piston 218, to thereby support the annular pressure plate 329 so as to be unrotatable relative to the piston 218, but axially movable relative to the piston 218.

The rotary-to-linear ramp 351 of the ball-and-ramp mechanism 327 is rotatably supported by the annular pressure plate 329 through intermediation of the thrust bearing 328. The other end surface of the annular pressure plate 329 abuts against the bottom part 219 of the piston 218 to press the piston 218. Or the other end surface of the annular pressure plate 329, the reception recesses 371 for receiving the pawl parts 336 bent inward of the retainer 310 are respectively formed on outer peripheral parts between the respective protrusions 368.

Further, as illustrated in FIG. 13, an ECU 375 constructed of an electronic control device for controlling the drive of the motor 400 is electrically connected to the motor 400. A parking switch 376 to be operated for instructions to actuate and release the parking brake is connected to the ECU 375. Moreover, the ECU 375 can be actuated based on the signal from the vehicle side (not shown), independently of the operation of the parking switch 376.

Next, operations of the disc brake 201 according to this embodiment are described.

First, operations during breaking of the disc brake 201 serving as a general hydraulic brake through operations of a brake pedal (not shown) are described.

When a driver depresses the brake pedal, a hydraulic pressure in accordance with a pedaling force of the brake pedal is supplied from the master cylinder (not shown) to the hydraulic chamber 221 inside the caliper 204 through a hydraulic circuit (not shown). Thus, the piston 218 moves forward from its original position in a non-braking state (moves in the leftward direction in FIG. 13) while elastically deforming the piston seal 216, to thereby press the inner brake pad 202 against the disc rotor D'. Then, the caliper main body 206 moves in the rightward direction in FIG. 13 relative to the bracket 205 due to a reaction force against the pressing force of the piston 218, to thereby press the outer brake pad 203 mounted on the claw section 208 against the disc rotor D'. As a result, the disc rotor D' is squeezed between the pair of the inner and outer brake pads 202 and 203 so that a frictional force is generated, and a braking force for the vehicle is therefore generated.

Then, when the driver releases the brake pedal, the supply of the hydraulic pressure from the master cylinder is interrupted so that the hydraulic pressure inside the hydraulic chamber 221 is decreased. Thus, the piston 218 moves backward to the original position due to a restoring force generated through the elastic deformation of the piston seal 216. As a result, the braking force is released. Incidentally, when a movement amount of the piston 218 increases as the inner and outer brake pads 202 and 203 wear, and exceeds a limit of the elastic deformation of the piston seal 216, a slip occurs between the piston 218 and the piston seal 216. An original position of the piston 218 moves with respect to the caliper main body 206 as a result of the slip, and thus the pad clearances are adjusted to be constant.

Now, description is given of an operation as a parking brake, which is an example of an action (function) for maintaining the stop state of the vehicle.

First, when the parking switch 376 is operated in the release state of the parking brake so as to operate (apply) the parking brake, the ECU 375 drives the motor 400 so as to rotate, through intermediation of the spur gear multi-stage speed reduction mechanism 244, the sun gear 257 of the planetary gear speed reduction mechanism 245. Through the rotation of the sun gear 257, the carrier 262 rotates through intermediation of the planet gears 260. Then, the rotational torque is transmitted from the carrier 262 to the base nut 275.

Then, the rotation resistance torque against the application direction of the rotation member 325 (pushrod 302) with respect to the retainer 310 (piston 218), which is caused by the second spring clutch 324, is set to be larger than the rotation resistance torque by the first thread fitting part 305 between the pushrod 302 and the base nut 275. As a result, the rotation in the application direction of the pushrod 302 with respect to the base nut 275, which is caused by the first spring clutch 300, is permitted. As a result, while the first thread fitting part 305 is relatively rotated, in other words, only the base nut 275 is rotated in the application direction by the rotation of the base nut 275 in the application direction, the pushrod 302 moves forward along the axial direction toward the bottom part 219 side of the piston 218.

As a result, along with the pushrod 302, the retainer 310 and the respective components in the retainer 310 such as the one-end-side washer 320, the coil spring 321, the other-end-side washer 322, the support plate 323, the second spring clutch 324, the rotation member 325, the thrust bearing 326, the ball-and-ramp mechanism 327, the thrust bearing 328, and the annular pressure plate 329 integrally move forward in the axial direction to the bottom part 219 side of the piston 218. With the forward movement of those components, the annular pressure plate 329 abuts against the bottom part 219 of the piston 218. As a result of this abutment, the piston 218 moves forward, and the one end surface of the bottom part 219 of the piston 218 abuts against the inner brake pad 202.

Further, when the rotational drive of the motor 400 in the application direction continues, the movement of the pushrod 302 causes the piston 218 to start pressing the disc rotor D' through intermediation of the brake pads 202 and 203. When generation of this pressing force is started, an axial force corresponding to a reaction force against the pressing force next increases the rotation resistance torque in the first thread fitting part 305 between the pushrod 302 and the base nut 275, which becomes larger than the rotation resistance torque of the second spring clutch 224. As a result, as the base nut 275 rotates, the pushrod 302 starts rotating in the application direction along with the rotation member 325. Then, the rotation resistance torque in the second thread fitting part 306 between the pushrod 302 and the ball-and-ramp mechanism 327 is also increased by the reaction force against the pressing force applied to the disc rotor D', and hence the rotational torque in the application direction of the pushrod 302 is transmitted to the rotary-to-linear ramp 351 of the ball-and-ramp mechanism 327 through intermediation of the second thread fitting part 306.

At this time, the rotational torque in the application direction of the pushrod 302 is transmitted to the rotary-to-linear ramp 351 of the ball-and-ramp mechanism 327 while causing a relative rotational difference in the second thread fitting part 306 (the rotary-to-linear ramp 351 rotates slightly after the rotation of the pushrod 302). Then, while the rotary-to-linear ramp 351 of the ball-and-ramp mechanism 327 is rotating in the application direction, the respective balls 352 roll to separate the rotary-to-linear ramp 351 and the fixed ramp 350 from each other against the biasing force of the coil spring 321. As a result, the annular pressure plate 329 further presses the bottom part 219 of the piston 218. With this, the pressing forces of the inner and outer brake pads 202 and 203 against the disc rotor D' increase.

It should be noted that, in the disc brake 201 according to this embodiment, first, the first thread fitting part 305 between the pushrod 302 and the base nut 275 relatively rotates, and then the pushrod 302 moves forward, thereby causing the piston 218 to move forward, resulting in the pressing force on the disc rotor D'. As a result, the original position of the pushrod 302 with respect to the piston 218 changed by secular wears of the inner and outer brake pads 202 and 203 can be adjusted by the operation of the first thread fitting part 305.

Then, the ECU 375 drives the motor 400 until the pressing force applied from the pair of the inner and outer brake pads 202 and 203 to the disc rotor D' reaches a predetermined value, for example, until the current value of the motor 400 reaches a predetermined value. After that, when it is detected that the pressing force applied to the disc rotor D' reaches the predetermined value based on the detection that the current value of the motor 400 reaches the predetermined value, the ECU 375 stops energizing the motor 400. Then, the linear motion caused by the rotation of the rotary-to-linear ramp 351 of the ball-and-ramp mechanism 327 is stopped.

Finally, the reaction force against the pressing force from the disc rotor D' acts on the rotary-to-linear ramp 351, but the second thread fitting part 306 between the pushrod 302 and the ball-and-ramp mechanism 327 is constructed as the thread fitting part that does not mutually operate inversely, and the first thread fitting part 305 between the pushrod 302 and the base nut 275 is also constructed as the thread fitting part that does not mutually operate inversely. Further, the rotation resistance torque against the release direction with respect to the base nut 275 is applied to the pushrod 302 by the first spring clutch 300. This configuration holds the piston 218 in the braking position. Thus, the braking force is held and the actuation of the parking brake is completed.

Next, a case where the parking brake is released is described. When the parking brake is to be released, based on the parking release operation on the parking switch 376, the ECU 375 drives and rotates the motor 400 in the release direction for separating the piston 218 from the disc rotor D'. As a result, the spur gear multi-stage speed reduction mechanism 244 and the planetary gear speed reduction mechanism 245 carry out the rotational drive in the release direction of returning the piston 218, and the rotational drive is transmitted to the base nut 275 through intermediation of the carrier 262.

On this occasion, the reaction force against the pressing force from the disc rotor D' acts on the pushrod 302. In other words, the rotation resistance torque of the second thread fitting part 306 between the pushrod 302 and the ball-and-ramp mechanism 327, the rotation resistance torque of the first thread fitting part 305 between the pushrod 302 and the base nut 275, and the rotation resistance torque against the release direction of the pushrod 302 with respect to the base nut 275, which is caused by the first spring clutch 300, are applied to the pushrod 302. Therefore, the rotational torque in the release direction from the base nut 275 is transmitted to the pushrod 302 (including the rotation member 325), and is also transmitted to the rotary-to-linear ramp 351 of the ball-and-ramp mechanism 327. As a result, the rotary-to-linear ramp 351 only rotates in the release direction so as to return to the initial position in the rotational direction.

Then, the reaction force applied to the pushrod 302 decreases, and the rotation resistance torque of the second thread fitting part 306 between the pushrod 302 and the ball-and-ramp mechanism 327 becomes smaller than the rotation resistance, which is the sum of the rotation resistance torque against the release direction of the pushrod 302 with respect to the base nut 275, which is caused by the first spring clutch 300, and the rotation resistance torque of the first thread fitting part 305 between the pushrod 302 and the base nut 275. Therefore, the rotary-to-linear ramp 351 cannot rotate in the release direction any more. Thus, only the second thread fitting part 306 relatively rotates, and the rotary-to-linear ramp 351 of the ball-and-ramp mechanism 327 moves together with the retainer 310 along the axial direction toward the bottom wall 211 side (in the release direction) of the cylinder 215, and returns to the initial position in the axial direction.

Further, when the motor 400 is driven to rotate in the release direction, and the rotation of the base nut 275 in the release direction continues, the rotary-to-linear ramp 351 of the ball-and-ramp mechanism 327 returns to the initial position in the axial direction, and the second thread fitting part 306 between the pushrod 302 and the ball-and-ramp mechanism 327 returns to the initial threadedly engaged position. Thus, the rotation of the pushrod 302 in the release direction stops.

When the rotation of the base nut 275 in the release direction further continues, the pushrod 302 moves backward along the axial direction toward the bottom wall 211 side (in the release direction) of the cylinder 215 against the rotation resistance torque against the release direction of the pushrod 302 with respect to the base nut 275, which is caused by the first spring clutch 300. As a result, along with the pushrod 302, the retainer 310 and the respective components in the retainer 310 such as the one-end-side washer 320, the coil spring 321, the other-end-side washer 322, the support plate 323, the second spring clutch 324, the rotation member 325, the thrust bearing 326, the ball-and-ramp mechanism 327, the thrust bearing 328, and the annular pressure plate 329 integrally move backward along the axial direction toward the bottom wall 211 side (in the release direction) of the cylinder 215. Then, the piston 218 moves backward to the original position by a restoring force generated through the elastic deformation of the piston seal 216, and the braking force is completely released.

It should be noted that, in a pad replacement mode, the pushrod 302 moves backward more than in the normal state, and enters a fully released state. On this occasion, the ECU 375 detects a motor current when the end of the pushrod 302 comes in contact with the bottom of the base nut 275 (adjuster), and then stops the motor. Even after the motor current is stopped, the motor rotates by inertia, and the end of the pushrod 302 seizes with the bottom of the base nut 275. As a result, upon a next application, the motor needs to be rotated at a high torque, and, consequently, other components may be damaged.

Then, a surface roughness is increased at a thread stroke position (in a neighborhood of a threading start part close to the spline shaft 308) used only in the pad replacement mode. The generated torque is increased by the slide of the first spring clutch 300 to this part with the increased surface roughness. Moreover, as a result, the motor current increases, and hence such control that the current is stopped upon the rise of the current (before the end of the pushrod 302 seizes with the base nut 275) can be carried out. Thus, in the fully released state, a clearance for the replacement of the pads can be secured. It should be noted that the magnitude of the generated torque can be adjusted by adjusting the level of the surface roughness.

As described above, in the disc brake 201 according to this embodiment, the coil part 300B of the first spring clutch 300 is wound on the thread groove 303A of the male thread 303 of the pushrod 302, and hence a space for winding the coil part 300B does not need to be secured on the pushrod 302, resulting in a compact structure. Moreover, when the rotation resistance torque is applied to the pushrod 302 upon the release, the coil part 300B of the first spring clutch 300 comes in contact with both of the two walls of the thread groove 303A. Thus, the contact area increases, and the rotation resistance torque can thus be increased. As a result, even if the number of windings of the first spring clutch 300 is reduced, the required resistance torque can be maintained.

Moreover, the first spring clutch 300 moves along the thread groove 303A, and a position relationship between the distal end part 300A of the first spring clutch 300 and the lock groove 298 of the base nut does not change. Thus, and the lock groove 298 can be set to be short, resulting in space saving.

Moreover, the first spring clutch 300 moves along the thread groove 303A, and the sliding part is thus not concentrated to a single position and can be distributed, resulting in an increase in durability of the sliding part.

Moreover, when the first spring clutch 300 is mounted to the male thread 303, the first spring clutch 300 can be inserted by rotation along the thread groove 303A, resulting in suppression of an extension amount and a deformation amount of the first spring clutch 300.

Moreover, the sliding position is not concentrated to a single location, and thus the generated torque depending on the stroke position can be adjusted by changing the surface roughness and the shape depending on the slide position of the thread groove 303A.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2014-157186 filed on Jul. 31, 2014 and No. 2014-265019 filed on Dec. 26, 2014. The entire disclosures of No. 2014-157186 filed on Jul. 31, 2014 and No. 2014-265019 filed on Dec. 26, 2014 including specification, claims, drawings and summary are incorporated herein by reference in its entirety.

What is claimed is:

1. A disc brake, comprising:
a pair of pads arranged on both sides of a rotor in an axial direction of the rotor;
a piston configured to press one of the pair of pads against the rotor:
a caliper main body including a cylinder in which the piston is movably arranged;
an electric motor installed on the caliper main body; and
a rotary-to-linear conversion mechanism installed on the caliper main body, which is configured to thrust the piston so as to hold the piston in a braking position, wherein:
the rotary-to-linear conversion mechanism comprises:
 a rotation transmission member to which a rotation of the electric motor is transmitted;
 a shaft member threadedly fitted to the rotation transmission member so that a rotation and linear motion of the shaft member are enabled; and
 a ball-and-ramp mechanism threadedly fitted to the shaft member, which is configured to apply a thrust in the axial direction to the piston through the rotation of the shaft member;
the shaft member comprises a first thread threadedly fitted to the rotation transmission member, which is formed on one end side of the shaft member, and a second thread threadedly fitted to the ball-and-ramp mechanism, which is formed on another end side of the shaft member; and
a rotation friction torque of the first thread is larger than a rotation friction torque of the second thread.

2. A disc brake according to claim 1, wherein a diameter of the first thread is larger than a diameter of the second thread.

3. A disc brake according to claim 1, wherein:
the rotary-to-linear conversion mechanism comprises a first one-way clutch configured to apply a rotation resistance torque against a rotation in one direction; and
the first one-way clutch applies the rotation resistance torque against a rotation of the shaft member with respect to the rotation transmission member in a release direction in which the piston is moved backward.

4. A disc brake according to claim 3, wherein:
the rotary-to-linear conversion mechanism comprises a second one-way clutch configured to apply a rotation resistance torque against a rotation in one direction; and
the second one-way clutch applies the rotation resistance torque against a rotation of the shaft member with respect to the piston in an application direction in which the piston is thrusted.

5. A disc brake according to claim 3, wherein when the piston is moved backward in the release direction, a rotation resistance torque in a thread fitting part between the shaft member and the ball-and-ramp mechanism is smaller than a rotation resistance torque acquired by adding a rotation resistance torque in a thread fitting part between the shaft member and the rotation transmission member to the rotation resistance torque applied by the first one-way clutch.

6. A disc brake according to claim 4, wherein when the piston is moved backward in the release direction, a rotation resistance torque in a thread fitting part between the shaft member and the ball-and-ramp mechanism is smaller than a rotation resistance torque acquired by adding a rotation resistance torque in a thread fitting part between the shaft member and the rotation transmission member to the rotation resistance torque applied by the first one-way clutch.

7. A disc brake according to claim 1, further comprising a one-way clutch configured to apply a rotation resistance torque against a rotation of the shaft member in one direction,
wherein the one-way clutch comprises a coil part, and the coil part is wound around a thread groove of a male thread formed in a thread fitting part of the shaft member with respect to the rotation transmission member.

8. A disc brake according to claim 7, wherein:
the one-way clutch comprises a distal end part extending outward in a radial direction of the shaft member; and
the distal end part is fitted to a lock groove formed on the rotation transmission member.

9. A disc brake according to claim 7, wherein the one-way clutch applies a rotation resistance torque against a rotation of the rotation transmission member upon release, and permits the rotation of the rotation transmission member upon application.

* * * * *